US012701443B2

(12) United States Patent
Hindy et al.

(10) Patent No.: US 12,701,443 B2
(45) Date of Patent: **\*Aug. 4, 2026**

(54) CHANNEL STATE INFORMATION REPORTING

(71) Applicant: Lenovo (Singapore) PTE. LTD., New Tech Park (SG)

(72) Inventors: Ahmed Hindy, Aurora, IL (US); Vijay Nangia, Woodridge, IL (US); Udar Mittal, Rolling Meadows, IL (US); Khalid Zeineddine, Evanston, IL (US)

(73) Assignee: Lenovo (Singapore) Pte. Ltd., Singapore (SG)

( \* ) Notice: Subject to any disclaimer, the term of this patent is extended or adjusted under 35 U.S.C. 154(b) by 769 days.

This patent is subject to a terminal disclaimer.

(21) Appl. No.: 17/921,064

(22) PCT Filed: Apr. 22, 2021

(86) PCT No.: PCT/IB2021/053341
§ 371 (c)(1),
(2) Date: Oct. 24, 2022

(87) PCT Pub. No.: WO2021/214711
PCT Pub. Date: Oct. 28, 2021

(65) Prior Publication Data
US 2023/0344486 A1 Oct. 26, 2023

Related U.S. Application Data

(60) Provisional application No. 63/015,372, filed on Apr. 24, 2020, provisional application No. 63/015,359, (Continued)

(51) Int. Cl.
*H04W 24/08* (2009.01)
*H04B 7/024* (2017.01)
(Continued)

(52) U.S. Cl.
CPC ............ *H04W 24/08* (2013.01); *H04B 7/024* (2013.01); *H04B 7/0626* (2013.01); (Continued)

(58) Field of Classification Search
None
See application file for complete search history.

(56) References Cited

U.S. PATENT DOCUMENTS

| | | | | |
|---|---|---|---|---|
| 2012/0208547 | A1* | 8/2012 | Geirhofer | ............. H04W 24/10 455/452.2 |
| 2013/0208604 | A1* | 8/2013 | Lee | ....................... H04L 5/0037 370/252 |

(Continued)

FOREIGN PATENT DOCUMENTS

| | | |
|---|---|---|
| EP | 3573273 A1 | 11/2019 |
| WO | 2018229078 A1 | 12/2018 |

(Continued)

OTHER PUBLICATIONS

PCT/IB2021/053341, "Notification of Transmittal of the International Search Report and the Written Opinion of the International Searching authority, or the Declaration", International Searching Authority, Jul. 15, 2021, pp. 1-14.
(Continued)

*Primary Examiner* — Ayman A Abaza
*Assistant Examiner* — Camquyen Thai
(74) *Attorney, Agent, or Firm* — Kunzler Needham Hilton

(57) ABSTRACT

One method includes receiving channel state information report configuration information, wherein the channel state information report configuration information includes: information indicating one or more channel state information channel state information reference signal resource configurations associated with a channel state information channel state information reference signal resource set for
(Continued)

channel measurement and a channel state information interference management resource set for interference measurement; and information indicating that channel state information feedback corresponding to multiple points is used. The method includes generating a set of channel state information reports based on the channel state information report configuration information. Each channel state information report in the set of channel state information reports includes two parts. The method includes reporting the set of channel state information reports to the network.

20 Claims, 11 Drawing Sheets

Related U.S. Application Data filed on Apr. 24, 2020, provisional application No. 63/015,366, filed on Apr. 24, 2020.

(51) Int. Cl.
| | |
|---|---|
| *H04B 7/06* | (2006.01) |
| *H04B 17/345* | (2015.01) |
| *H04L 5/00* | (2006.01) |
| *H04W 24/10* | (2009.01) |

(52) U.S. Cl.
CPC ......... *H04B 7/0639* (2013.01); *H04B 17/345* (2015.01); *H04L 5/0057* (2013.01); *H04W 24/10* (2013.01)

(56) References Cited

U.S. PATENT DOCUMENTS

| | | | | |
|---|---|---|---|---|
| 2013/0258954 | A1* | 10/2013 | Khoshnevis | H04L 1/0027 |
| | | | | 370/329 |
| 2013/0308488 | A1* | 11/2013 | Tong | H04W 24/10 |
| | | | | 370/252 |
| 2013/0336244 | A1* | 12/2013 | Kuo | H04L 27/2601 |
| | | | | 370/328 |
| 2015/0023194 | A1* | 1/2015 | Seo | H04W 24/10 |
| | | | | 370/252 |
| 2015/0117380 | A1* | 4/2015 | Zhang | H04L 5/0048 |
| | | | | 370/329 |
| 2017/0033912 | A1* | 2/2017 | Onggosanusi | H04L 5/0048 |
| 2018/0287765 | A1* | 10/2018 | Lee | H04W 24/08 |
| 2019/0059013 | A1* | 2/2019 | Rahman | H04L 1/00 |
| 2019/0081678 | A1* | 3/2019 | Park | H04W 72/56 |
| 2019/0260448 | A1 | 8/2019 | Rahman et al. | |
| 2019/0349103 | A1 | 11/2019 | Wang et al. | |
| 2019/0379506 | A1 | 12/2019 | Cheng | |
| 2021/0314043 | A1* | 10/2021 | Hao | H04B 7/0417 |
| 2021/0328644 | A1 | 10/2021 | Hao et al. | |
| 2021/0337415 | A1* | 10/2021 | Chen | H04L 5/0057 |
| 2021/0391967 | A1 | 12/2021 | Gao et al. | |
| 2022/0149908 | A1 | 5/2022 | Gao et al. | |
| 2023/0062132 | A1 | 3/2023 | Wu et al. | |
| 2023/0208490 | A1 | 6/2023 | Kim et al. | |

FOREIGN PATENT DOCUMENTS

| | | |
|---|---|---|
| WO | 2020032621 A1 | 2/2020 |
| WO | 2020056708 A1 | 3/2020 |
| WO | 2020059146 A1 | 3/2020 |
| WO | 2020089863 A1 | 5/2020 |
| WO | 2020144602 A1 | 7/2020 |
| WO | 2021015552 A1 | 1/2021 |

OTHER PUBLICATIONS

Samsung, WF on Type I and II CSI codebooks, 3GPP TSG-RAN WG1 #89 R1-1709232, May 15-19, 2017, p. 1-24.

Huawei Hisilicon, CSI measurement enhancement for multi-TRP/panel transmission, 3GPP TSG RAN WG1 Meeting #97 R1-1906038, May 13-17, 2019, p. 1-4.

LG Electronics, Discussion on CSI enhancement for NCJT, 3GPP TSG RAN WG1 #97 R1-1906736, May 14-17, 2019, p. 1-3.

Spreadtrum Communications, "Discussion on CSI enhancement for multiple TRP/Panel transmission", 3GPP TSG RAN WG1 #98 R1-1908961, Aug. 26-30, 2019, pp. 1-4.

3GPP, 3rd Generation Partnership Project; Technical Specification Group Radio Access Network; NR; Physical channels and modulation (Release 16), 3GPP TS 38.211 V16.1.0, Mar. 2020, p. 1-130.

3GPP, 3rd Generation Partnership Project; Technical Specification Group Radio Access Network; NR; Physical layer procedures for data (Release 16), 3GPP TS 38.214 V16.1.0, Mar. 2020, p. 1-130.

U.S. Appl. No. 17/921,075, "Office Action Summary", US Patent and Trademark Office, Feb. 13, 2025, pp. 1-19.

U.S. Appl. No. 17/921,058, "Office Action Summary", US Patent and Trademark Office, Feb. 18, 2025, pp. 1-20.

PCT/IB2021/053340, "Notification of Transmittal of the International Search Report and the Written Opinion of the International Searching authority, or the Declaration", International Searching Authority, Jun. 23, 2021, pp. 1-15.

PCT/IB2021/053343, "Notification of Transmittal of the International Search Report and the Written Opinion of the International Searching authority, or the Declaration", International Searching Authority, Jun. 25, 2021, pp. 1-12.

Ericsson, Views on CSI framework for multi-TRP, 3GPP TSG RAN WG1 Meeting #97 R1-1907424, May 13-17, 2019, p. 1-2.

Ericsson, CSI feedback for multi-TRP, 3GPP TSG-RAN WG1 #91 R1-1720974, Nov. 27-Dec. 1, 2017, p. 1-9.

U.S. Appl. No. 17/921,058, "Office Action Summary", US Patent and Trademark Office, Jun. 25, 2025, pp. 1-28.

U.S. Appl. No. 17/921,058, "Office Action Summary", US Patent and Trademark Office, Oct. 29, 2025, pp. 1-27.

Spreadtrum Communications, "Discussion on Multi-TRP transmission", 3GPP TSG RAN WG1 #99 R1-1912562, Nov. 18-22, 2019, pp. 1-10.

MCC Support, "Final Report of 3GPP TSG RAN WG1 #98bis v2.0.0 (Chongqing, China, Oct. 14-20, 2019)", 3GPP TSG RAN WG1 Meeting #99 R1-1913275, Nov. 18-22, 2019, pp. 1-160.

\* cited by examiner

100

200

300

500

```
CSI-AperiodicTriggerState ::= SEQUENCE {
        associatedReportConfigInfoList      SEQUENCE (SIZE(1..maxNrofReportConfigPerAperiodicTrigger))
                                                OF CSI-AssociatedReportConfigInfo,

. . .
}

CSI-AssociatedReportConfigInfo ::= SEQUENCE {
        reportConfigId                  CSI-ReportConfigId,
        resourcesForChannel             CHOICE{
            nzp-CSI-RS SEQUENCE {
                resourceSet             INTEGER (1..maxNrofNZP-CSI-ResourceSetsPerConfig),
                qcl-info                SEQUENCE (SIZE(1..maxNrofAP-CSI-RS-ResourcesPerSet))
                                            OF TCI-StateId OPTIONAL – Cond Aperiodic
            },
            csi-SSB-ResourceSet         INTEGER (1..maxNrofCSI-SSB-ResourceSetsPerConfig)
        },
        csi-IM-ResourcesForInterference     INTEGER(1..maxNrofCSI-IM-ResourceSetsPerConfig),
        nzp-CSI-RS-ResourcesForInterference INTEGER (1..maxNrofNZP-CSI-RS-ResourceSetsPerConfig)
        . . .
}
```

```
NZP-CSI-RS-Resource ::= SEQUENCE {
        nzp-CSI-RS-ResourceId  NZP-CSI-RS-ResourceId,
        resourceMapping               CSI-RS-ResourceMapping,
        powerControlOffset     INTEGER (-8..15),
        powerControlOffsetSS   ENUMERATED{db-3, db0, db3, db6} OPTIONAL, -- Need R
        scramblingID           ScramblingId,
        periodicityAndOffset   CSI-ResourcePeriodicityAndOffset OPTIONAL, -
        qcl-InfoPeriodicCSI-RS   TCI-StateId OPTIONAL, -- Cond Periodic
        . . .
}
```

```
CSI-IM-Resource ::= SEQUENCE {
        csi-IM-ResourceId                     CSI-IM-ResourceId,
        csi-IM-ResourceElementPattern         CHOICE {
            pattern0 SEQUENCE {
                subcarrierLocation-p0         ENUMERATED { s0, s2, s4, s6, s8, s10 },
                symbolLocation-p0             INTEGER (0..12)
            },
            pattern1 SEQUENCE {
                subcarrierLocation-p1         ENUMERATED { s0, s4, s8 },
                symbolLocation-p1             INTEGER (0..13)
            }
        } OPTIONAL, -- Need M
        freqBand                              CSI-FrequencyOccupation OPTIONAL,
        periodicityAndOffset                  CSI-ResourcePeriodicityAndOffset OPTIONAL,
        PeriodicOrSemiPersistent
    . . .
}
```

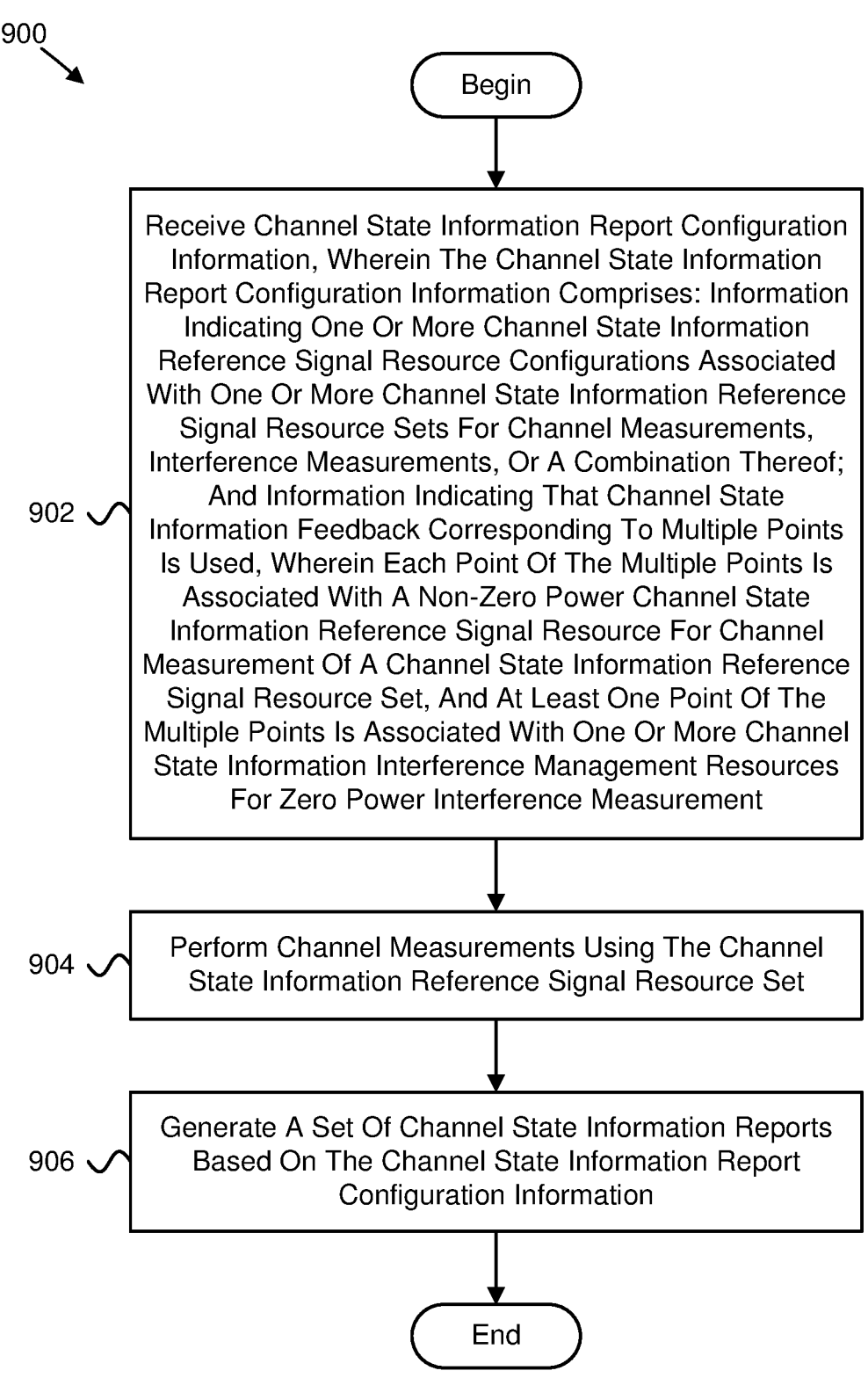

Begin

902  Receive Channel State Information Report Configuration Information, Wherein The Channel State Information Report Configuration Information Comprises: Information Indicating One Or More Channel State Information Reference Signal Resource Configurations Associated With One Or More Channel State Information Reference Signal Resource Sets For Channel Measurements, Interference Measurements, Or A Combination Thereof; And Information Indicating That Channel State Information Feedback Corresponding To Multiple Points Is Used, Wherein Each Point Of The Multiple Points Is Associated With A Non-Zero Power Channel State Information Reference Signal Resource For Channel Measurement Of A Channel State Information Reference Signal Resource Set, And At Least One Point Of The Multiple Points Is Associated With One Or More Channel State Information Interference Management Resources For Zero Power Interference Measurement 904  Perform Channel Measurements Using The Channel State Information Reference Signal Resource Set 906  Generate A Set Of Channel State Information Reports Based On The Channel State Information Report Configuration Information End

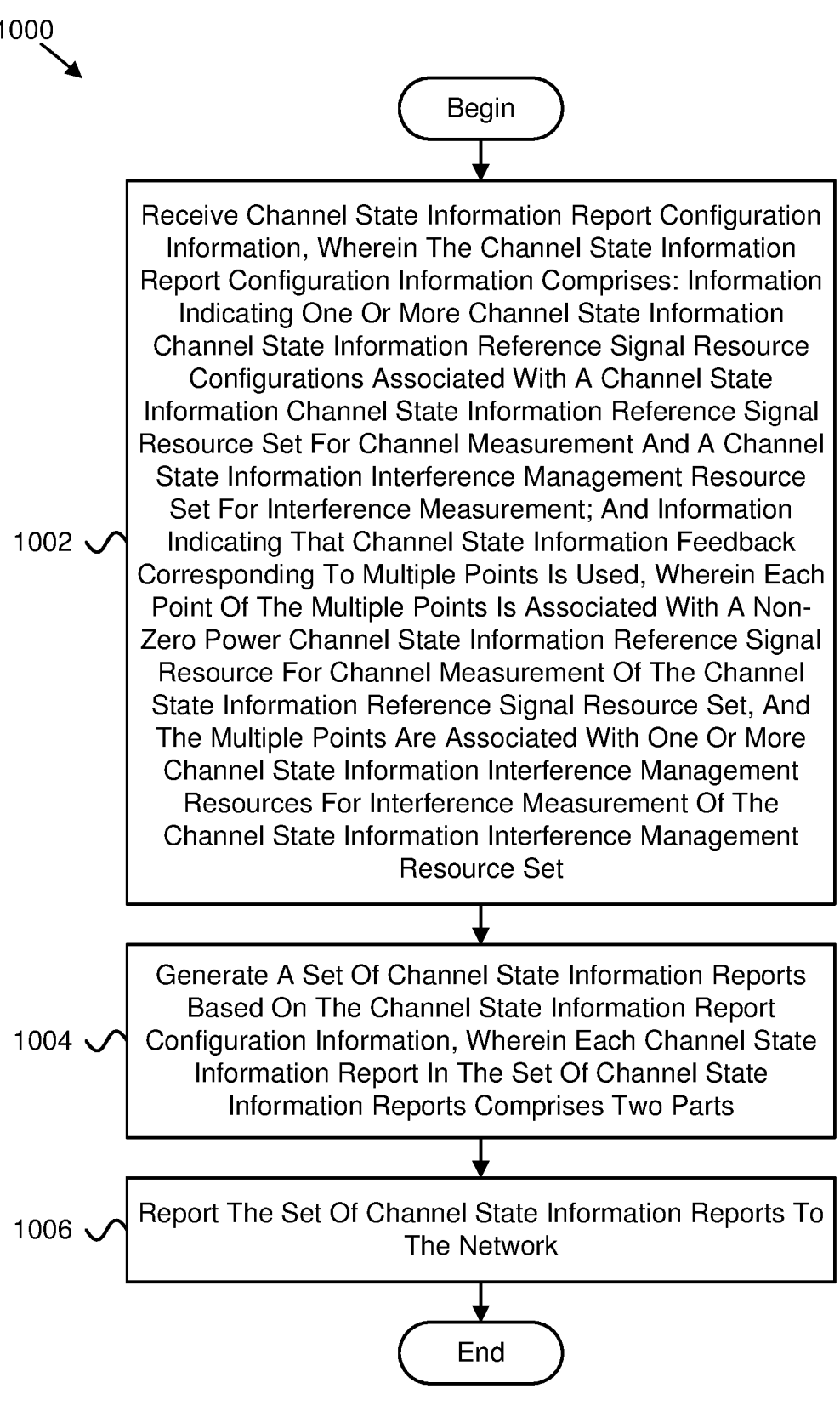

Begin

1002   Receive Channel State Information Report Configuration Information, Wherein The Channel State Information Report Configuration Information Comprises: Information Indicating One Or More Channel State Information Channel State Information Reference Signal Resource Configurations Associated With A Channel State Information Channel State Information Reference Signal Resource Set For Channel Measurement And A Channel State Information Interference Management Resource Set For Interference Measurement; And Information Indicating That Channel State Information Feedback Corresponding To Multiple Points Is Used, Wherein Each Point Of The Multiple Points Is Associated With A Non-Zero Power Channel State Information Reference Signal Resource For Channel Measurement Of The Channel State Information Reference Signal Resource Set, And The Multiple Points Are Associated With One Or More Channel State Information Interference Management Resources For Interference Measurement Of The Channel State Information Interference Management Resource Set 1004   Generate A Set Of Channel State Information Reports Based On The Channel State Information Report Configuration Information, Wherein Each Channel State Information Report In The Set Of Channel State Information Reports Comprises Two Parts 1006   Report The Set Of Channel State Information Reports To The Network End

Begin

1102 Receive Channel State Information Report Configuration Information, Wherein The Channel State Information Report Configuration Information Comprises: Information Indicating One Or More Channel State Information-Reference Signal Resource Configurations Associated With At Least One Non-Zero Power Channel State Information Reference Signal Resource Set For Channel Measurement; And Information Indicating That The Channel State Information Report Configuration Corresponding To Multiple Points Is Used, Wherein The Multiple Points Are Associated With A Primary Group Of Points Or A Secondary Group Of Points 1104 Perform Channel Measurements Using The At Least One Non-Zero Power Channel State Information Reference Signal Resource Set 1106 Generate A Set Of Channel State Information Reports Based On The Channel State Information Report Configuration Information End

FIG. 11

CHANNEL STATE INFORMATION REPORTING

CROSS-REFERENCE TO RELATED APPLICATIONS

This application claims priority to U.S. Patent Application Ser. No. 63/015,359 entitled "APPARATUSES, METHODS, AND SYSTEMS FOR CSI REPORTING ENHANCEMENTS FOR MULTI-TRP/PANEL TRANSMISSION" and filed on Apr. 24, 2020 for Ahmed Hindy, U.S. Patent Application Ser. No. 63/015,366 entitled "APPARATUSES, METHODS, AND SYSTEMS FOR CSI REPORTING ENHANCEMENTS FOR MULTI-TRP/PANEL TRANSMISSION: HYPOTHESIS REDUCTION" and filed on Apr. 24, 2020 for Ahmed Hindy, and U.S. Patent Application Ser. No. 63/015,372 entitled "APPARATUSES, METHODS, AND SYSTEMS FOR CSI REPORTING ENHANCEMENTS FOR MULTI-TRP/PANEL TRANSMISSION" and filed on Apr. 24, 2020 for Khalid Zeineddine, all of which are incorporated herein by reference in their entirety.

FIELD

The subject matter disclosed herein relates generally to wireless communications and more particularly relates to channel state information reporting.

BACKGROUND

In certain wireless communications networks, one or more channel state information reports may be made. In multi-TRP and/or multi-panel networks, channel state information reports may be transmitted inefficiently.

BRIEF SUMMARY

Methods for channel state information reporting are disclosed. Apparatuses and systems also perform the functions of the methods. One embodiment of a method includes receiving channel state information report configuration information. The channel state information report configuration information includes: information indicating one or more channel state information reference signal resource configurations associated with one or more channel state information reference signal resource sets for channel measurements, interference measurements, or a combination thereof, and information indicating that channel state information feedback corresponding to multiple points is used. Each point of the multiple points is associated with a non-zero power channel state information reference signal resource for channel measurement of a channel state information reference signal resource set, and at least one point of the multiple points is associated with one or more channel state information interference management resources for zero power interference measurement. In some embodiments, the method includes performing channel measurements using the channel state information reference signal resource set. In various embodiments, the method includes generating a set of channel state information reports based on the channel state information report configuration information.

One apparatus for channel state information reporting includes a receiver configured to receive channel state information report configuration information, wherein the channel state information report configuration information includes: information indicating one or more channel state information reference signal resource configurations associated with one or more channel state information reference signal resource sets for channel measurements, interference measurements, or a combination thereof; and information indicating that channel state information feedback corresponding to multiple points is used, wherein each point of the multiple points is associated with a non-zero power channel state information reference signal resource for channel measurement of a channel state information reference signal resource set, and at least one point of the multiple points is associated with one or more channel state information interference management resources for zero power interference measurement. In various embodiments, the apparatus includes a processor configured to: perform channel measurements using the channel state information reference signal resource set; and generate a set of channel state information reports based on the channel state information report configuration information, wherein each point of the multiple points corresponds to a transmission-and-reception point or a panel of a transmission-and-reception point, and wherein the information indicating that channel state information feedback for multiple points is used includes: a radio resource control parameter within the channel state information report configuration; a channel state information report quantity within the channel state information report configuration; a quasi-co-location relationship involving one or more channel state information reference signal resources within the one or more channel state information reference signal resource sets; a codepoint indicating different downlink control information states; a codebook type parameter; a codebook configuration parameter; a transmission configuration indicator codepoint from a transmission configuration comprising at least two transmission configuration indicator states; an indication of a spatial division multiplexing scheme across multiple points; or some combination thereof.

Another embodiment of a method for channel state information reporting includes receiving channel state information report configuration information, wherein the channel state information report configuration information comprises: information indicating one or more channel state information channel state information reference signal resource configurations associated with a channel state information channel state information reference signal resource set for channel measurement and a channel state information interference management resource set for interference measurement; and information indicating that channel state information feedback corresponding to multiple points is used, wherein each point of the multiple points is associated with a non-zero power channel state information reference signal resource for channel measurement of the channel state information reference signal resource set, and the multiple points are associated with one or more channel state information interference management resources for interference measurement of the channel state information interference management resource set. In some embodiments, the method includes generating a set of channel state information reports based on the channel state information report configuration information, wherein each channel state information report in the set of channel state information reports comprises two parts. In various embodiments, the method includes reporting the set of channel state information reports to the network.

Another apparatus for channel state information reporting includes a receiver configured to receive channel state information report configuration information, wherein the channel state information report configuration information comprises: information indicating one or more channel state information channel state information reference signal resource configurations associated with a channel state information channel state information reference signal resource set for channel measurement and a channel state information interference management resource set for interference measurement; and information indicating that channel state information feedback corresponding to multiple points is used, wherein each point of the multiple points is associated with a non-zero power channel state information reference signal resource for channel measurement of the channel state information reference signal resource set, the multiple points are associated with one or more channel state information interference management resources for interference measurement of the channel state information interference management resource set, and each point of the multiple points corresponds to a transmission-and-reception point or a panel of a transmission-and-reception point. In various embodiments, the apparatus includes a processor configured to: generate a set of channel state information reports based on the channel state information report configuration information, wherein each channel state information report in the set of channel state information reports comprises two parts; and report the set of channel state information reports to the network.

A further embodiment of a method for channel state information reporting includes receiving channel state information report configuration information, wherein the channel state information report configuration information comprises: information indicating one or more channel state information-reference signal resource configurations associated with at least one non-zero power channel state information reference signal resource set for channel measurement; and information indicating that the channel state information report configuration corresponding to multiple points is used, wherein the multiple points are associated with a primary group of points or a secondary group of points. In some embodiments, the method includes performing channel measurements using the at least one non-zero power channel state information reference signal resource set. In various embodiments, the method includes generating a set of channel state information reports based on the channel state information report configuration information.

A further apparatus for channel state information reporting includes a receiver configured to receive channel state information report configuration information, wherein the channel state information report configuration information comprises: information indicating one or more channel state information-reference signal resource configurations associated with at least one non-zero power channel state information reference signal resource set for channel measurement; and information indicating that the channel state information report configuration corresponding to multiple points is used, wherein the multiple points are associated with a primary group of points or a secondary group of points. In various embodiments, the apparatus includes a processor configured to: perform channel measurements using the at least one non-zero power channel state information reference signal resource set; and generate a set of channel state information reports based on the channel state information report configuration information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5 is a code sample illustrating one embodiment of the process by which an aperiodic trigger state indicates a resource set and QCL information;

FIG. 6 is a code sample illustrating one embodiment of an RRC configuration including an NZP-CSI-RS resource and a CSI-IM-resource;

FIG. 9 is a flow chart diagram illustrating one embodiment of a method for channel state information reporting;

FIG. 10 is a flow chart diagram illustrating another embodiment of a method for channel state information reporting; and FIG. 11 is a flow chart diagram illustrating a further embodiment of a method for channel state information reporting.

DETAILED DESCRIPTION

Figure 1:
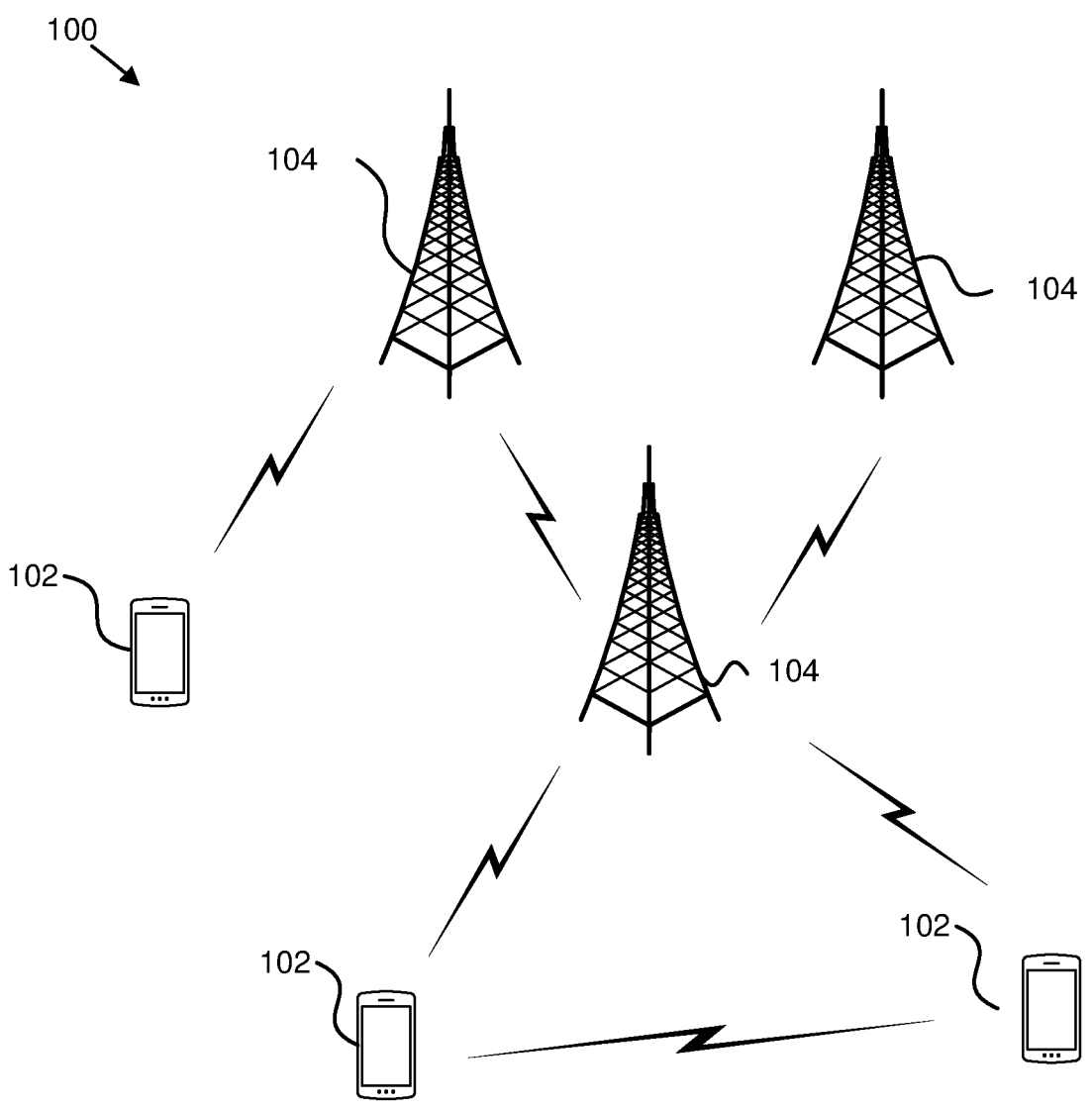
FIG. 1 is a schematic block diagram illustrating one embodiment of a wireless communication system for channel state information reporting.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for channel state information reporting. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle onboard computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive channel state information report configuration information. The channel state information report configuration information includes: information indicating one or more channel state information reference signal resource configurations associated with one or more channel state information reference signal resource sets for channel measurements, interference measurements, or a combination thereof, and information indicating that channel state information feedback corresponding to multiple points is used. Each point of the multiple points is associated with a non-zero power channel state information reference signal resource for channel measurement of a channel state information reference signal resource set, and at least one point of the multiple points is associated with one or more channel state information interference management resources for zero power interference measurement. In some embodiments, the remote unit 102 may perform channel measurements using the channel state information reference signal resource set. In various embodiments, the remote unit 102 may generate a set of channel state information reports based on the channel state information report configuration information. Accordingly, the remote unit 102 may be used for channel state information reporting.

In certain embodiments, a remote unit 102 may receiving channel state information report configuration information, wherein the channel state information report configuration information comprises: information indicating one or more channel state information channel state information reference signal resource configurations associated with a channel state information channel state information reference signal resource set for channel measurement and a channel state information interference management resource set for interference measurement; and information indicating that channel state information feedback corresponding to multiple points is used, wherein each point of the multiple points is associated with a non-zero power channel state information reference signal resource for channel measurement of the channel state information reference signal resource set, and the multiple points are associated with one or more channel state information interference management resources for interference measurement of the channel state information interference management resource set. In some embodiments, the remote unit 102 may generate a set of channel state information reports based on the channel state information report configuration information, wherein each channel state information report in the set of channel state information reports comprises two parts. In various embodiments, the remote unit 102 may report the set of channel state information reports to the network. Accordingly, the remote unit 102 may be used for channel state information reporting.

In some embodiments, a remote unit 102 may receive channel state information report configuration information, wherein the channel state information report configuration information comprises: information indicating one or more channel state information-reference signal resource configurations associated with at least one non-zero power channel state information reference signal resource set for channel measurement; and information indicating that the channel state information report configuration corresponding to multiple points is used, wherein the multiple points are associated with a primary group of points or a secondary group of points. In some embodiments, the remote unit 102 may perform channel measurements using the at least one non-zero power channel state information reference signal resource set. In various embodiments, the remote unit 102 may generate a set of channel state information reports based on the channel state information report configuration information. Accordingly, the remote unit 102 may be used for channel state information reporting.

Figure 2:
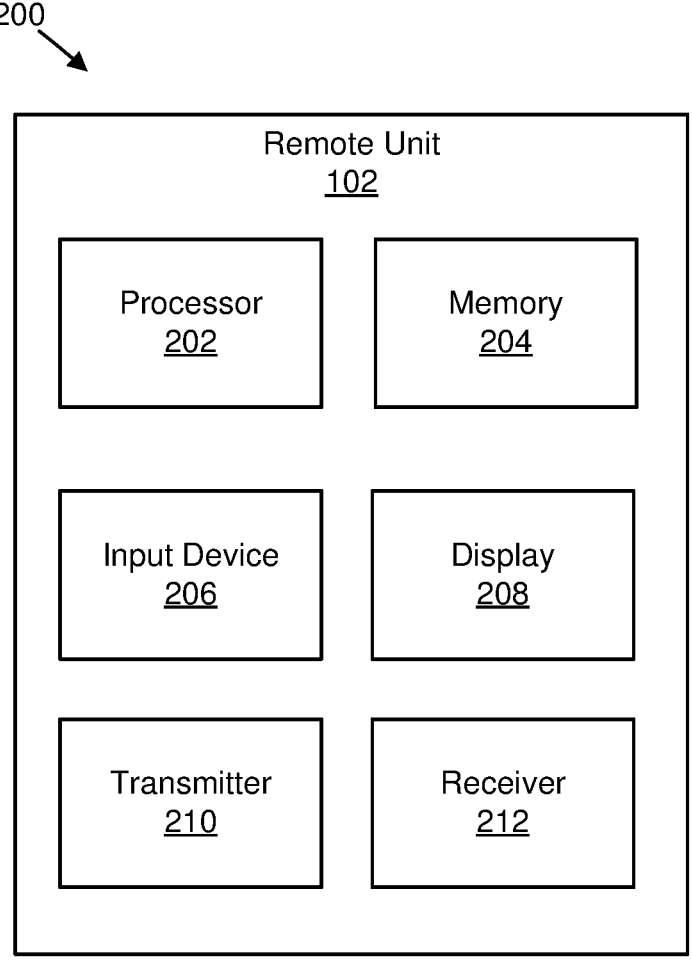
FIG. 2 is a schematic block diagram illustrating one embodiment of an apparatus that may be used for channel state information reporting.

FIG. 2 depicts one embodiment of an apparatus 200 that may be used for channel state information reporting. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In some embodiments, the receiver 212 is configured to receive channel state information report configuration information, wherein the channel state information report configuration information includes: information indicating one or more channel state information reference signal resource configurations associated with one or more channel state information reference signal resource sets for channel measurements, interference measurements, or a combination thereof, and information indicating that channel state information feedback corresponding to multiple points is used, wherein each point of the multiple points is associated with a non-zero power channel state information reference signal resource for channel measurement of a channel state information reference signal resource set, and at least one point of the multiple points is associated with one or more channel state information interference management resources for zero power interference measurement. In various embodiments, the processor 202 is configured to: perform channel measurements using the channel state information reference signal resource set; and generate a set of channel state information reports based on the channel state information report configuration information, wherein each point of the multiple points corresponds to a transmission-and-reception point or a panel of a transmission-and-reception point, and wherein the information indicating that channel state information feedback for multiple points is used includes: a radio resource control parameter within the channel state information report configuration; a channel state information report quantity within the channel state information report configuration; a quasi-co-location relationship involving one or more channel state information reference signal resources within the one or more channel state information reference signal resource sets; a codepoint indicating different downlink control information states; a codebook type parameter; a codebook configuration parameter; a transmission configuration indicator codepoint from a transmission configuration comprising at least two transmission configuration indicator states; an indication of a spatial division multiplexing scheme across multiple points; or some combination thereof.

In certain embodiments, the receiver 212 is configured to receive channel state information report configuration information, wherein the channel state information report configuration information comprises: information indicating one or more channel state information channel state information reference signal resource configurations associated with a channel state information channel state information reference signal resource set for channel measurement and a channel state information interference management resource set for interference measurement; and information indicating that channel state information feedback corresponding to multiple points is used, wherein each point of the multiple points is associated with a non-zero power channel state information reference signal resource for channel measurement of the channel state information reference signal resource set, the multiple points are associated with one or more channel state information interference management resources for interference measurement of the channel state information interference management resource set, and each point of the multiple points corresponds to a transmission-and-reception point or a panel of a transmission-and-reception point. In various embodiments, the processor 202 is configured to: generate a set of channel state information reports based on the channel state information report configuration information, wherein each channel state information report in the set of channel state information reports comprises two parts; and report the set of channel state information reports to the network.

In various embodiments, the receiver 212 is configured to receive channel state information report configuration information, wherein the channel state information report configuration information comprises: information indicating one or more channel state information-reference signal resource configurations associated with at least one non-zero power channel state information reference signal resource set for channel measurement; and information indicating that the channel state information report configuration corresponding to multiple points is used, wherein the multiple points are associated with a primary group of points or a secondary group of points. In various embodiments, the processor 202 is configured to: perform channel measurements using the at least one non-zero power channel state information reference signal resource set; and generate a set of channel state information reports based on the channel state information report configuration information.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
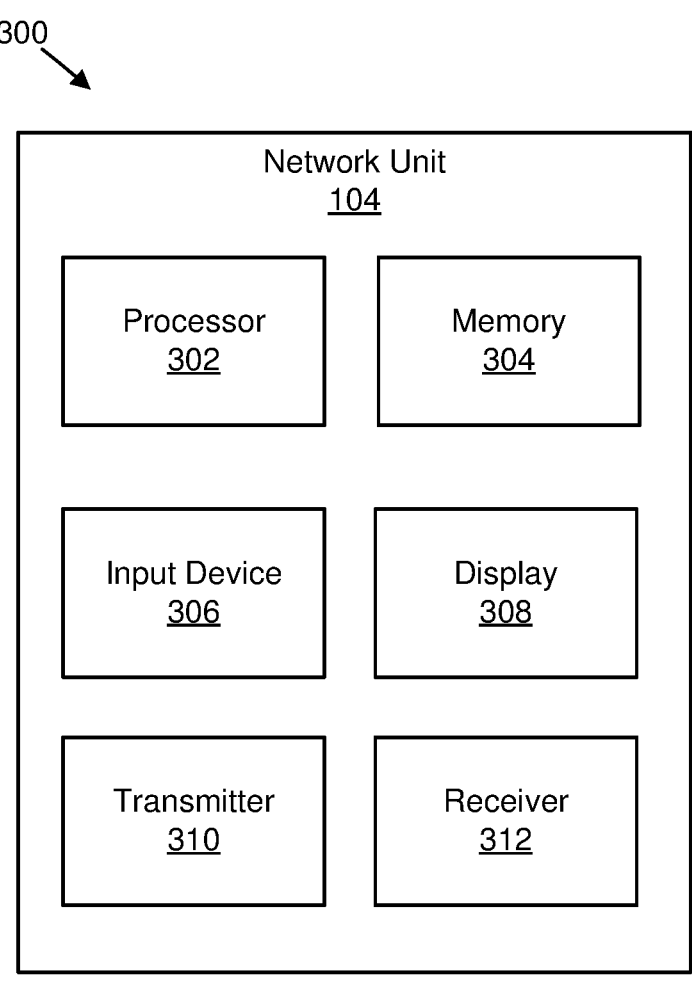
FIG. 3 is a schematic block diagram illustrating one embodiment of an apparatus that may be used for channel state information reporting.

FIG. 3 depicts one embodiment of an apparatus 300 that may be used for channel state information reporting. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, such as for new radio ("NR"), multiple transmission and reception points ("TRPs") or multiple antenna panels within a TRP may communicate simultaneously with one user equipment ("UE") to enhance coverage, throughput, and/or reliability. In some embodiments, such as for Type-II codebook with high resolution, a number of precoding matrix indicator ("PMI") bits fed back from the UE in a gNB via uplink control information ("UCI") may be very large (e.g., >1000 bits at large bandwidth), even for a single-point transmission. In certain embodiments, reducing a number of PMI feedback bits per report may improve efficiency.

In some embodiments, multiple-input multiple-output ("MIMO") enhancements in NR may include multi-TRP and multi-panel transmissions. In such embodiments, multi-TRP transmission may improve spectral efficiency, reliability, and/or robustness of a connection, and may be used for both ideal and nonideal backhaul.

In certain embodiments, to increase spectral efficiency using multi-TRP, non-coherent joint transmission ("NCJT") may be used. Unlike coherent joint transmission that uses tight synchronization between the TRPs and a high channel state information ("CSI") accuracy for precoding design, NCJT requires that each TRP transmits different layers of the same codeword (e.g., single scheduling downlink control information ("DCI")—two physical downlink shared channel ("PDSCH") transmissions) or the layers corresponding to a single codeword (e.g., two-scheduling DCIs—two PDSCH transmissions).

In various embodiments, a maximum of two TRP joint transmissions may be used. In such embodiments, a UE may be served by multiple TRPs forming a coordination cluster (e.g., possibly connected to a central processing unit).

In some embodiments, a UE may be dynamically scheduled to be served by one of multiple TRPs in a cluster. In certain embodiments, a network may pick two TRPs to perform joint transmission. In various embodiments, a UE may report needed CSI information for a network for it to decide a multi-TRP downlink transmission scheme.

In certain embodiments, a number of transmission hypotheses increases exponentially with number of TRPs in a coordination cluster. For example, for 4 TRPs, you may have 10 transmission hypotheses: (TRP 1), (TRP 2), (TRP 3), (TRP 4), (TRP 1, TRP 2), (TRP 1, TRP 3), (TRP 1, TRP 4), (TRP 2, TRP 3), (TRP 2, TRP 4), and (TRP 3, TRP 4). The overhead from reporting may increase dramatically with the size of the coordination cluster.

In various embodiments, uplink transmission resources on which CSI reports are transmitted might not be enough, and partial CSI omission may be used. In some embodiments, CSI reports may be prioritized according to: 1) time-domain behavior and physical channel, where more dynamic reports are given precedence over less dynamic reports and physical uplink shared channel ("PUSCH") has precedence over physical uplink control channel ("PUCCH"); 2) CSI content, where beam reports (e.g., layer 1 reference signal received power ("L1-RSRP") reporting) has priority over regular CSI reports; 3) the serving cell to which the CSI corresponds (e.g., with carrier aggregation ("CA") operation)—CSI corresponding to the primary cell ("PCell") has priority over CSI corresponding to secondary cells ("Scells"); and 4) a report configuration identifier (e.g., reportConfigID). In such embodiments, the ordering may not take into account that some multi-TRP NCJT transmission hypotheses, as measured by a UE, may achieve low spectral efficiency performance and may be given a lower priority.

Certain embodiments described herein, for the purpose of multi-TRP NCJT PDSCH transmission, may enable a UE to: 1) reduce CSI reporting overhead without degrading performance; and/or 2) modify partial CSI omission priorities to favor multi-TRP transmission hypotheses with higher spectral efficiency.

In some embodiments, smart techniques for CSI feedback reporting may be used such that different reports corresponding to different transmission configurations are jointly designed to reduce the overall CSI feedback overhead for multi-TRP and/or panel transmission.

In various embodiments, if a gNB is equipped with a two-dimensional ("2D") antenna array with $N_1$, $N_2$ antenna ports per polarization placed horizontally and vertically and communication occurs over $N_3$ PMI sub-bands, and a PMI subband includes a set of resource blocks, each resource block including a set of subcarriers. In such embodiments, $2N_1N_2$ CSI-RS ports may be used to enable downlink ("DL") channel estimation with high resolution for NR Type-II codebook. To reduce uplink ("UL") feedback overhead, a Discrete Fourier transform ("DFT")-based CSI compression of a spatial domain may be applied to L dimensions per polarization, where $L<N_1N_2$. The magnitude and phase values of the linear combination coefficients for each subband may be fed back to the gNB as part of a CSI report. The $2N_1N_2\times N_3$ codebook per layer may take on the form: $W=W_1W_2$, where $W_1$ is a $2N_1N_2\times 2L$ block-diagonal matrix $(L<N_1N_2)$ with two identical diagonal blocks, e.g., $$W_1 = \begin{bmatrix} B & 0 \\ 0 & B \end{bmatrix},$$

and B is an $N_1N_2\times L$ matrix with columns drawn from a 2D oversampled DFT matrix, as follows:

$$u_m = \begin{bmatrix} 1 & e^{j\frac{2\pi m}{O_2 N_2}} & \cdots & e^{j\frac{2\pi m(N_2-1)}{O_2 N_2}} \end{bmatrix},$$

$$v_{l,m} = \begin{bmatrix} u_m & e^{j\frac{2\pi l}{O_1 N_1}}u_m & \cdots & e^{j\frac{2\pi l(N_1-1)}{O_1 N_1}}u_m \end{bmatrix}^T,$$

$$B = \begin{bmatrix} v_{l_0,m_0} & v_{l_1,m_1} & \cdots & v_{l_{L-1},m_{L-1}} \end{bmatrix},$$

$$l_i = O_1 n_1^{(i)} + q_1, 0 \le n_1^{(i)} < N_1, 0 \le q_1 < O_1 - 1,$$

$$m_i = O_2 n_2^{(i)} q_2, 0 \le n_2^{(i)} < N_2, 0 \le q_2 < O_2 - 1,$$

where the superscript T denotes a matrix transposition operation. $O_1$, $O_2$ oversampling factors are assumed for the 2D DFT matrix from which matrix B is drawn. $W_1$ is common across all layers. $W_2$ is a $2L\times N_3$ matrix, where the $i^{th}$ column corresponds to the linear combination coefficients of the 2L beams in the $i^{th}$ sub-band. Only the indices of the L selected columns of B are reported, along with the oversampling index taking on $O_1O_2$ values. Note that $W_2$ are independent for different layers.

In some embodiments, for Type-II codebook, frequency compression may be applied in conjunction with spatial compression. In addition to spatial compression of Type-II codebook, an Inverse Discrete Fourier transform ("IDFT")-based CSI compression in the frequency domain may be applied, where each beam of the frequency-domain precoding vectors is transformed using an inverse DFT matrix applied to the delay domain, and the magnitude and phase values of a subset of the delay-domain coefficients are selected and fed back to the gNB as part of the CSI report. The $2N_1N_2\times N_3$ codebook per layer may take on the form:

$$W = W_1\tilde{W}_2W_f^H,$$

where $W_1$ may have the same design and reporting framework as in another embodiment of Type-II codebook. $W_f$ is an $N_3\times M$ matrix $(M<N_3)$ with columns selected from a critically-sampled size-$N_3$ DFT matrix, as follows:

$$W_f = \begin{bmatrix} f_{k_0} & f_{k_1} & \cdots & f_{k_{M-1}} \end{bmatrix},$$

$$0 \le k_i < N_3 - 1,$$

$$f_k = \begin{bmatrix} 1 & e^{-j\frac{2\pi k}{N_3}} & \cdots & e^{-j\frac{2\pi k(N_3-1)}{N_3}} \end{bmatrix}^T.$$

For $W_f$, only indices of M selected columns out of a predefined size-$N_3$ DFT matrix may be reported. Hence, L, M represent equivalent spatial and frequency dimensions after compression, respectively. Finally, the $2L\times M$ matrix $\tilde{W}_2$ represents a linear combination coefficients ("LCCs") of the spatial and frequency DFT-basis vectors. Both are $\tilde{W}_2$ and $W_f$ and independent for different layers. Magnitude and phase values of an approximately $\beta$ fraction of the 2LM available coefficients are reported to the gNB ($\beta<1$) as part of the CSI report (e.g., coefficients with zero magnitude may be indicated via a per-layer bitmap—since all coefficients reported within a layer may be normalized with respect to a coefficient with the largest magnitude (e.g., strongest coefficient), the relative value of that coefficient is set to unity, and no magnitude or phase information is explicitly reported for this coefficient—only an indication of an index of the strongest coefficient per layer is reported). Hence, for a single-layer transmission, magnitude and phase values of a maximum of $\lceil 2\beta LM \rceil - 1$ coefficients (e.g., along with the indices of selected L, M DFT vectors) may be reported per layer, leading to significant reduction in CSI report size, compared with reporting $2N_1N_2 \times N_3 - 1$ coefficients' information.

In various embodiments, such as for Type-II port selection codebook, only K (e.g., where $K \leq 2N_1N_2$) beamformed CSI-RS ports may be used in DL transmission to reduce complexity. A $K \times N_3$ codebook matrix per layer may take on the form:

$$W = W_1^{PS} \tilde{W}_2 W_f^H.$$

Here, $\tilde{W}_2$ and $W_3$ follow the same structure as certain embodiments of a Type-II codebook, and may be layer $$W_1^{PS} = \begin{bmatrix} E & 0 \\ 0 & E \end{bmatrix}$$

and E is an $$\frac{K}{2} \times L$$

matrix whose columns are standard unit vectors, as follows:

$$E = \begin{bmatrix} e_{\mathrm{mod}(m_{PS}d_{PS},K/2)}^{(K/2)} & e_{\mathrm{mod}(m_{PS}d_{PS}+1,K/2)}^{(K/2)} & \cdots & e_{\mathrm{mod}(m_{PS}d_{PS}+L-1,K/2)}^{(K/2)} \end{bmatrix},$$

where $$e_i^{(K)}$$

is a standard unit vector with a 1 at the $i^{th}$ location. Here, $d_{PS}$ is an RRC parameter which takes on the values $\{1, 2, 3, 4\}$ under the condition $d_{PS} \leq \min(K/2, L)$, whereas $m_{PS}$ takes on the values $$\left\{ 0, \ldots, \left\lceil \frac{K}{2d_{PS}} \right\rceil - 1 \right\}$$

and is reported as part of the UL CSI feedback overhead. $W_1$ is common across all layers.

For K=16, L=4 and $d_{PS}=1$, the 8 possible realizations of E corresponding to $m_{PS}=\{0, 1, \ldots, 7\}$ are as follows:

$$\begin{bmatrix} 1&0&0&0 \\ 0&1&0&0 \\ 0&0&1&0 \\ 0&0&0&1 \\ 0&0&0&0 \\ 0&0&0&0 \\ 0&0&0&0 \\ 0&0&0&0 \end{bmatrix} \begin{bmatrix} 0&0&0&0 \\ 1&0&0&0 \\ 0&1&0&0 \\ 0&0&1&0 \\ 0&0&0&1 \\ 0&0&0&0 \\ 0&0&0&0 \\ 0&0&0&0 \end{bmatrix} \begin{bmatrix} 0&0&0&0 \\ 0&0&0&0 \\ 1&0&0&0 \\ 0&1&0&0 \\ 0&0&1&0 \\ 0&0&0&1 \\ 0&0&0&0 \\ 0&0&0&0 \end{bmatrix} \begin{bmatrix} 0&0&0&0 \\ 0&0&0&0 \\ 0&0&0&0 \\ 1&0&0&0 \\ 0&1&0&0 \\ 0&0&1&0 \\ 0&0&0&1 \\ 0&0&0&0 \end{bmatrix},$$

-continued $$\begin{bmatrix} 0&0&0&0 \\ 0&0&0&0 \\ 0&0&0&0 \\ 0&0&0&0 \\ 1&0&0&0 \\ 0&1&0&0 \\ 0&0&1&0 \\ 0&0&0&1 \end{bmatrix} \begin{bmatrix} 0&0&0&1 \\ 0&0&0&0 \\ 0&0&0&0 \\ 0&0&0&0 \\ 0&0&0&0 \\ 1&0&0&0 \\ 0&1&0&0 \\ 0&0&1&0 \end{bmatrix} \begin{bmatrix} 0&0&1&0 \\ 0&0&0&1 \\ 0&0&0&0 \\ 0&0&0&0 \\ 0&0&0&0 \\ 0&0&0&0 \\ 1&0&0&0 \\ 0&1&0&0 \end{bmatrix} \begin{bmatrix} 0&1&0&0 \\ 0&0&1&0 \\ 0&0&0&1 \\ 0&0&0&0 \\ 0&0&0&0 \\ 0&0&0&0 \\ 0&0&0&0 \\ 1&0&0&0 \end{bmatrix}.$$

When $d_{PS}=2$, the 4 possible realizations of E corresponding to $m_{PS}=\{0, 1, 2, 3\}$ are as follows:

$$\begin{bmatrix} 1&0&0&0 \\ 0&1&0&0 \\ 0&0&1&0 \\ 0&0&0&1 \\ 0&0&0&0 \\ 0&0&0&0 \\ 0&0&0&0 \\ 0&0&0&0 \end{bmatrix} \begin{bmatrix} 0&0&0&0 \\ 1&0&0&0 \\ 0&1&0&0 \\ 0&0&1&0 \\ 0&0&0&1 \\ 0&0&0&0 \\ 0&0&0&0 \\ 0&0&0&0 \end{bmatrix} \begin{bmatrix} 0&0&0&0 \\ 0&0&0&0 \\ 0&0&0&0 \\ 0&0&0&0 \\ 1&0&0&0 \\ 0&1&0&0 \\ 0&0&1&0 \\ 0&0&0&1 \end{bmatrix} \begin{bmatrix} 0&0&1&0 \\ 0&0&0&1 \\ 0&0&0&0 \\ 0&0&0&0 \\ 0&0&0&0 \\ 0&0&0&0 \\ 1&0&0&0 \\ 0&1&0&0 \end{bmatrix}.$$

When $d_{PS}=3$, the 3 possible realizations of E corresponding of $m_{PS}=\{0, 1, 2\}$ are as follows:

$$\begin{bmatrix} 1&0&0&0 \\ 0&1&0&0 \\ 0&0&1&0 \\ 0&0&0&1 \\ 0&0&0&0 \\ 0&0&0&0 \\ 0&0&0&0 \\ 0&0&0&0 \end{bmatrix} \begin{bmatrix} 0&0&0&0 \\ 0&0&0&0 \\ 0&0&0&0 \\ 1&0&0&0 \\ 0&1&0&0 \\ 0&0&1&0 \\ 0&0&0&1 \\ 0&0&0&0 \end{bmatrix} \begin{bmatrix} 0&0&1&0 \\ 0&0&0&1 \\ 0&0&0&0 \\ 0&0&0&0 \\ 0&0&0&0 \\ 0&0&0&0 \\ 1&0&0&0 \\ 0&1&0&0 \end{bmatrix}.$$

When $d_{PS}=4$, the 2 possible realizations of E corresponding of $m_{PS}=\{0, 1\}$ are as follows:

$$\begin{bmatrix} 1&0&0&0 \\ 0&1&0&0 \\ 0&0&1&0 \\ 0&0&0&1 \\ 0&0&0&0 \\ 0&0&0&0 \\ 0&0&0&0 \\ 0&0&0&0 \end{bmatrix} \begin{bmatrix} 0&0&0&0 \\ 0&0&0&0 \\ 0&0&0&0 \\ 0&0&0&0 \\ 1&0&0&0 \\ 0&1&0&0 \\ 0&0&1&0 \\ 0&0&0&1 \end{bmatrix}.$$

To summarize, $m_{PS}$ parametrizes the location of the first 1 in the first column of E, whereas $d_{PS}$ represents the row shift corresponding to different values of $m_{PS}$.

In certain embodiments, NR Type-I codebook may be a baseline codebook for NR with a variety of configurations. In various embodiments, a Type-I codebook may be an embodiment of NR Type-II codebook with L=1 for RI=1, 2, wherein a phase coupling value is reported for each sub-band, e.g., $W_2$ is $2 \times N_3$, with the first row equal to $[1, 1, \ldots, 1]$ and the second row equal to $[e^{j2\pi\emptyset_0}, \ldots, e^{j2\pi\emptyset_{N_3}-1}]$. In some embodiments, $\emptyset_0 = \emptyset_1 \ldots = \emptyset_5$, e.g., wideband reporting. For RI >2, different beams may be used for each pair of layers. In some embodiments, NR Type-I codebook may be depicted as a low-resolution version of NR Type-II codebook with spatial beam selection per layer-pair and phase combining only.

In various embodiments, a codebook report may be partitioned into two parts based on a priority of information reported. Each part may be encoded separately (e.g., part 1 may have a higher code rate). In certain embodiments, a content of a CSI report includes: 1) part 1: RI+CQI+total number of coefficients; and 2) part 2: SD basis indicator+FD basis indicator/layer+bitmap and/or layer+coefficient amplitude information and/or layer+coefficient phase information and/or layer+strongest coefficient indicator and/or layer. Furthermore, part 2 CSI may be decomposed into sub-parts with each having a different priority (e.g., higher priority information listed first). Such partitioning may be made to enable dynamic reporting size for a codebook based on available resources in an uplink phase.

In certain embodiments, Type-II codebook may be based on aperiodic CSI reporting, and only reported in PUSCH via DCI triggering (e.g., one exception). Type-I codebook may be based on periodic CSI reporting (e.g., PUCCH) or semi-persistent CSI reporting (e.g., PUSCH or PUCCH) or aperiodic reporting (e.g., PUSCH). Table 1 illustrated one embodiment of prioritization.

TABLE 1

Priority 0:
For CSI reports 1 to $N_{Rep}$, Group 0 CSI for CSI reports configured as 'typeII-r16' or 'typeII-PortSelection-r16';
Part 2 wideband CSI for CSI reports configured otherwise
Priority 1:
Group 1 CSI for CSI report 1, if configured as 'typeII-r16' or 'typeII-PortSelection-r16'; Part 2 subband CSI of even subbands for CSI report 1, if configured otherwise
Priority 2:
Group 2 CSI for CSI report 1, if configured as 'typeII-r16' or 'typeII-PortSelection-r16'; Part 2 subband CSI of odd subbands for CSI report 1, if configured otherwise
Priority 3:
Group 1 CSI for CSI report 2, if configured as 'typeII-r16' or 'typeII-PortSelection-r16'; Part 2 subband CSI of even subbands for CSI report 2, if configured otherwise
Priority 4:
Group 2 CSI for CSI report 2, if configured as 'typeII-r16' or 'typeII-PortSelection-r16'. Part 2 subband CSI of odd subbands for CSI report 2, if configured otherwise

.
.
.

Priority $2N_{Rep}$ − 1:
Group 1 CSI for CSI report $N_{Rep}$, if configured as 'typeII-r16' or 'typeII-PortSelection-r16'; Part 2 subband CSI of even subbands for CSI report $N_{Rep}$, if configured otherwise
Priority $2N_{Rep}$:
Group 2 CSI for CSI report $N_{Rep}$, if configured as 'typeII-r16' or 'typeII-PortSelection-r16'; Part 2 subband CSI of odd subbands for CSI report $N_{Rep}$, if configured otherwise In some embodiments, a priority of the $N_{Rep}$ CSI reports may be based on: 1) a CSI report corresponding to one CSI reporting configuration for one cell may have higher priority compared with another CSI report corresponding to one other CSI reporting configuration for the same cell; 2) CSI reports intended for one cell may have higher priority compared with other CSI reports intended for another cell; 3) CSI reports may have higher priority based on CSI report content, (e.g., CSI reports carrying L1-RSRP information have higher priority); and/or 4) CSI reports may have higher priority based on their type (e.g., whether the CSI report is aperiodic, semi-persistent or periodic), and whether the report is sent via PUSCH or PUCCH.

In various embodiments, CSI reports may be prioritized as follows, where CSI reports with lower IDs have higher priority:

$Pri_{iCSI}(y,k,c,s)=2 \cdot N_{cells} \cdot M_s \cdot y+N_{cells} \cdot M_s \cdot k+M_s \cdot c+s,$
where s: CSI reporting configuration index, $M_s$: Maximum number of CSI reporting configurations, c: cell index, $N_{cells}$: number of serving cells, k: 0 for CSI reports carrying L1-RSRP or layer 1 signal to interference and noise ratio ("L1-SINR"), 1 otherwise, y: 0 for aperiodic reports, 1 for semi-persistent reports on PUSCH, 2 for semi-persistent reports on PUCCH, 3 for periodic reports.

In certain embodiments, for multi-TRP NCJT transmission, two embodiments may be used: 1) either one downlink scheduling assignment is sent from one TRP that schedules two PDSCH transmissions from two TRPs respectively—only one transport block ("TB") may be transmitted, whose layers are divided across the two scheduled PDSCHs; and 2) two downlink scheduling assignments may be sent with one scheduling DCI from each TRP. Each DCI may schedule a PDSCH transmission from a corresponding TRP. One or more TBs may be transmitted from every TRP based on a rank of a channel from every TRP.

In some embodiments, a UE may report CSI information for a network using a CSI framework. From a UE perspective, CSI reporting may be independent of what downlink NCJT scheme is used. The triggering mechanism between a report setting and a resource setting may be summarized in Table 2.

TABLE 2

| Triggering mechanism between a report setting and a resource setting | | | |
|---|---|---|---|
| | Periodic CSI reporting | Semi-Persistent ("SP") CSI reporting | AP CSI Reporting |
| Time Domain Behaviour of Resource Setting | Periodic CSI-RS | RRC configured | MAC CE (PUCCH) DCI (PUSCH) | DCI |
| | SP CSI-RS | Not Supported | MAC CE (PUCCH) DCI (PUSCH) | DCI |
| | AP CSI-RS | Not Supported | Not Supported | DCI |

In various embodiments: all associated resource settings for a CSI report setting may need to have a time domain behavior; periodic CSI-RS and/or interference management ("IM") resource and CSI reports may be assumed to be present and active once configured by RRC signaling; aperiodic and semi-persistent CSI-RS and/or IM resources and CSI reports may be explicitly triggered or activated; aperiodic CSI-RS and/or IM resources and aperiodic CSI reports—the triggering is done jointly by transmitting a DCI format 0-1; and/or semi-persistent CSI-RS and/or IM resources and semi-persistent CSI reports may be independently activated.

In certain embodiments, such as for multi-TRP NCJT, aperiodic CSI reporting may be likely to be triggered to inform a network about channel conditions for every transmission hypothesis, since using periodic CSI-RS for the TRPs in a coordination cluster constitutes a large overhead. In various embodiments, for aperiodic CSI-RS and/or IM resources and aperiodic CSI reports, triggering may be done jointly by transmitting a DCI format 0_1. The DCI format 0_1 contains a CSI request field (e.g., 0 to 6 bits). A non-zero request field points to a so-called aperiodic trigger state configured by RRC. An aperiodic trigger state may be defined as a list of up to 16 aperiodic CSI report settings, identified by a CSI report setting ID for which the UE calculates simultaneously CSI and transmits it on the scheduled PUSCH transmission.

Figure 4:
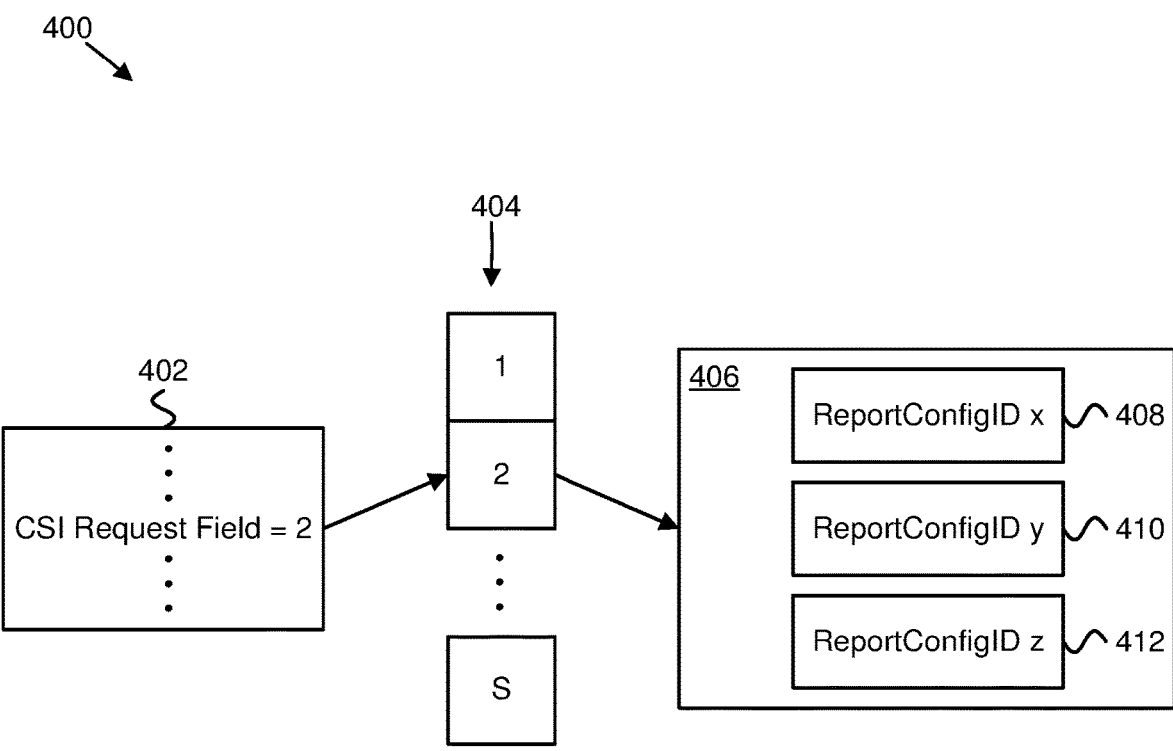
FIG. 4 is a diagram illustrating one embodiment of an aperiodic trigger state defining a list of CSI report settings.

FIG. 4 is a diagram 400 illustrating one embodiment of an aperiodic trigger state defining a list of CSI report settings. Specifically, the diagram 400 includes a DCI format 0_1 402, a CSI request codepoint 404, and an aperiodic trigger state 2 406. Moreover, the aperiodic trigger state 2 includes a ReportConfigID x 408, a ReportConfigID y 410, and a ReportConfigID z 412.

In some embodiments, if a CSI report setting is linked with an aperiodic resource setting (e.g., may include multiple resource sets), an aperiodic NZP CSI-RS resource set for channel measurement, an aperiodic CSI-IM resource set, and/or an aperiodic NZP CSI-RS resource set for IM to use for a given CSI report setting may be included in the aperiodic trigger state definition. For aperiodic NZP CSI-RS, a quasi-co-location ("QCL") source may be configured in the aperiodic trigger state. The UE may assume that resources used for computation of a channel and interference may be processed with the same spatial filter (e.g., quasi-co-located with respect to "QCL-TypeD").

FIG. 5 is a code sample 500 illustrating one embodiment of the process by which an aperiodic trigger state indicates a resource set and QCL information.

FIG. 6 is a code sample 600 illustrating one embodiment of an RRC configuration including an non-zero power channel state information reference signal ("NZP-CSI-RS") resource 602 and a CSI-IM-resource 604.

Table 3 shows uplink channels used for CSI reporting as a function of the CSI codebook type.

TABLE 3

Uplink channels used for CSI reporting as a function of the CSI codebook type

| | Periodic CSI reporting | SP CSI reporting | AP CSI reporting |
|---|---|---|---|
| Type I WB | PUCCH Format 2, 3, 4 | PUCCH Format 2 PUSCH | PUSCH |
| Type I SB | | PUCCH Format 3, 4 PUSCH | PUSCH |
| Type II WB | | PUCCH Format 3, 4 PUSCH | PUSCH |
| Type II SB | | PUSCH | PUSCH |
| Type II Part 1 only | | PUCCH Format 3, 4 | |

In certain embodiments, for aperiodic CSI reporting, PUSCH-based reports may be divided into two CSI parts: CSI part 1 and CSI part 2. The reason for this may be that a size of CSI payload varies significantly, and, therefore, a worst-case UCI payload size design may result in large overhead.

In various embodiments, CSI part 1 has a fixed payload size (e.g., may be decoded by a gNB without prior information) and may contain the following: 1) RI (if reported), CRI (if reported) and CQI for the first codeword; and/or 2) a number of non-zero wideband amplitude coefficients per layer for Type II CSI feedback on PUSCH.

In some embodiments, CSI part 2 has a variable payload size that may be derived from CSI parameters in CSI part 1, and may contain PMI and the CQI for the second codeword if RI >4.

Figure 7:
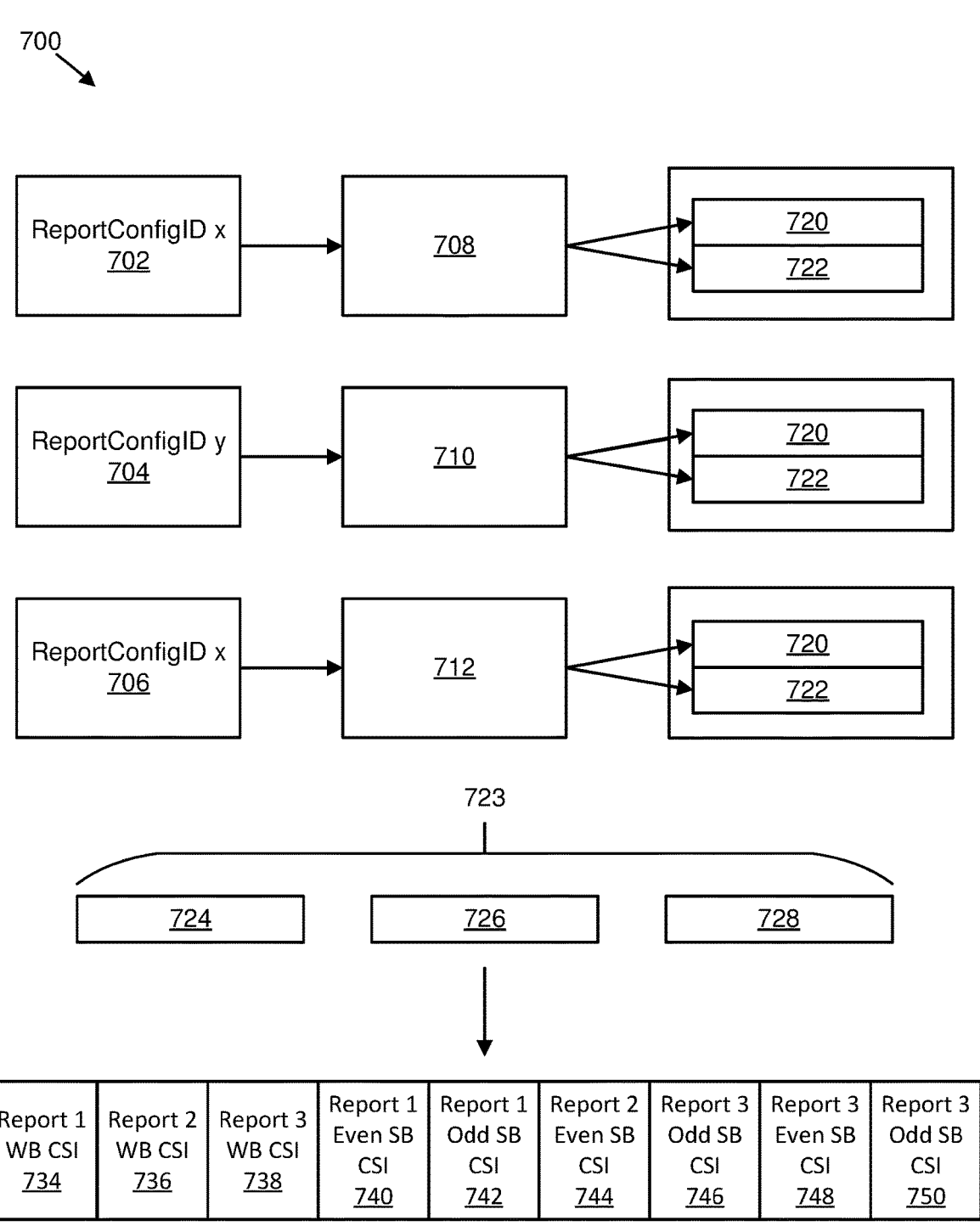
FIG. 7 is a schematic block diagram illustrating one embodiment of a partial CSI omission for PUSCH-based CSI.

In one example, if an aperiodic trigger state indicated by DCI format 0_1 defines 3 report settings x, y, and z, then aperiodic CSI reporting for CSI part 2 may be ordered as indicated in FIG. 7.

FIG. 7 is a schematic block diagram 700 illustrating one embodiment of a partial CSI omission for PUSCH-based CSI. The diagram 700 includes a ReportConfigID x 702, a ReportConfigID y 704, and a ReportConfigID z 706. Moreover, the diagram 700 includes a first report 708 (e.g., requested quantities to be reported) corresponding to the ReportConfigID x 702, a second report 710 (e.g., requested quantities to be reported) corresponding to the ReportConfigID y 704, and a third report 712 (e.g., requested quantities to be reported) corresponding to the ReportConfigID z 706. Each of the first report 708, the second report 710, and the third report 712 includes a CSI part 1 720, and a CSI part 2 722. An ordering 723 of CSI part 2 across reports is CSI part 2 of the first report 724, CSI part 2 of the second report 726, and CSI part 2 of the third report 728. Moreover, the CSI part 2 reports may produce a report 1 WB CSI 734, a report 2 WB CSI 736, a report 3 WB CSI 438, a report 1 even SB CSI 740, a report 1 odd SB CSI 742, a report 2 even SB CSI 744, a report 2 odd SB CSI 746, a report 3 even SB CSI 748, and a report 3 odd SB CSI 750.

In various embodiments, CSI reports may be prioritized according to: 1) time-domain behavior and physical channel where more dynamic reports are given precedence over less dynamic reports and PUSCH has precedence over PUCCH; 2) CSI content where beam reports (e.g., L1-RSRP reporting) have priority over regular CSI reports; 3) a serving cell to which a CSI corresponds (e.g., for CA operation)—CSI corresponding to a PCell has priority over CSI corresponding to Scells; and/or 4) a report configuration identifier (e.g., reportConfigID). In such embodiments, the ordering may not take into account that some multi-TRP NCJT transmission hypothesis, as measured by the UE, may achieve low spectral efficiency performance and may be given a lower priority.

In various embodiments, one or more elements or features from different embodiments may be combined (e.g., CSI measurement, feedback generation, and/or reporting) which may reduce overall CSI feedback overhead.

In some embodiments, the following assumptions may be used: 1) the notion of a "TRP" in a general fashion to include at least one of TRPs, panels, communication (e.g., signals and/or channels) associated with a control resource set ("CORESET") pool, and/or communication associated with a TCI state from a transmission configuration comprising at least two TCI states; 2) a codebook type used is arbitrary—flexibility for using different codebook types (e.g., Type-I and Type-II codebooks) unless otherwise stated; 3) at least aperiodic CSI reporting on PUSCH is supported—other CSI reporting configuration types such as semi-persistent CSI reporting on PUSCH may also be used; 4) at least a multi-TRP and/or panel with single DCI may be used—a multi-TRP and/or panel with multiple DCI may also be used; and/or 5) at least a multi-TRP and/or panel with spatial division multiplexing ("SDM") may be used.

In a first embodiment, a network may indicate to a UE that multi-TRP and/or panel CSI feedback is required via: 1) introducing a new radio resource control ("RRC") parameter (e.g., NTRP or CSIGroup)—based on that, there may be multiple CSI reports, CSI sub-reports, or CSI-components for one CSI report configuration—this parameter may be incorporated in CSI report priority ordering; 2) introducing a new report quantity (e.g., for CSI reports involving mTRP)—each report may correspond to a report setting; 3) multi-TRP may be implied from QCL relationships on RSs (e.g., aperiodic CSI-RS); 4) one or more codepoints referring to different DCI triggering states may be allocated to multi-TRP setup for CSI feedback—each state (e.g., including one or more CSI report settings) may be triggered by the network and RRC configured; 5) multi-TRP may be implied from a higher layer parameter CodebookType; 6) multi-TRP may be implied from a higher layer parameter CodebookConfig; and/or 7) introducing a new RRC parameter groupBasedCSIReporting (e.g., in CSI report configuration)—this parameter may enable multi-TRP and/or panel CSI feedback with a CSI report including a group of $N_g$ CSI reports, sub-CSI-reports, or CSI components.

In various embodiments, assume the following CSI reporting structure, wherein without loss of generality, all CSI reports or aperiodic (y=0), and do not carry L1-RSRP or L1-SINR info (k=1), $N_{TRP}$=3 and $M_s$=2. For TRP t, information corresponding to a rank $v_c$ codebook is reported, where layers per TRP t are partitioned into two groups with $v'_t$ and $v''_t$ layers, respectively, where $v_t=v'_t+v''_t$. CSI report 1: Information corresponding to the first $v'_1$ layers intended for TRP 1 are included. CSI report 2: Information corresponding to the last $v''_1$ layers intended for TRP 1 are included. CSI report 3: Information corresponding to the first $v'_2$ layers intended for TRP 2 are included. CSI report 4: Information corresponding to the last $v''_2$ layers intended for TRP 2 are included. CSI report 5: Information corresponding to the first $v'_3$ layers intended for TRP 3 are included. CSI report 6: Information corresponding to the last $v''_3$ layers intended for TRP 3 are included.

In a second embodiment, a subset of the following CSI reporting assumptions may be considered, as follows: 1) single TRP transmission, wherein the codebook at TRP t is based on CSI reports with indices 2(t−1)+1 and 2(t−1)+2; and 2) joint transmission involving TRPs t and $\tilde{t}$, the codebook at TRP t may be based on CSI report with index 2(t−1)+1, whereas the codebook at TRP $\tilde{t}$ would be based on CSI report with index 2($\tilde{t}$−1)+1, where $\tilde{t}$≠t. Interchanging the order of the content in CSI reports with indices 2(t−1)+1 and 2(t−1)+2 may not be precluded.

In certain embodiments, each of the CSI reports may be triggered via a CSI report setting. Each CSI report setting has a corresponding set of one or more CSI resource settings.

Since CSI reports with indices 2(t−1)+1 are involved in multi-TRP/Panel transmission, the codebook parameters may depend on the interference from the other TRP colluding to jointly transmit. Thus, a CSI report setting corresponding to a given CSI report with index 2(t−1)+1 may be configured with multiple CSI resource settings, wherein the first CSI resource setting may indicate non-zero power ("NZP") CSI-RS resource sets for channel measurement, and the subsequent CSI resource settings may indicate NZP CSI-RS for interference measurement and/or CSI-IM. The information in corresponding CSI reports may be prone to inter-layer interference from different TRPs, and may be designed based on both channel and interference measurements. CSI reports with indices 2(t−1)+2 may only be triggered in case of single TRP transmission. Accordingly, triggering a single CSI resource setting for a corresponding CSI report setting may suffice where the report may only measure the channel.

In a third embodiment, different CSI resource settings may be defined in accordance with different CSI report settings as follows: 1) for CSI reporting settings corresponding to CSI reports with indices 2(t−1)+1 (e.g., which include PMI for the first set of layers for TRP t which may be triggered with multi-TRP transmission), more than one CSI resource setting is triggered; and 2) for CSI reporting settings corresponding to CSI reports with indices 2(t−1)+2 (e.g., which include PMI for the last set of layers for TRP t which may be triggered for single-TRP transmission), more than one CSI resource setting is triggered.

In various embodiments, there may be a single CSI report per codebook. If, in one example, the CSI reports are restructured as follows, wherein without loss of generality, all CSI reports or aperiodic (y=0), and do not carry L1-RSRP or L1-SINR info (k=1), $N_{cells}$=3 and $M_s$=2. For TRP t information corresponding to a rank $v_c$ codebook is reported, where layers per TRP t are partitioned into two groups with $v'_t$ and $v''_t$ layers, respectively, where $v_t=v'_t+v''_t$. CSI report t: Information corresponding to TRP t. CSI report Part 1. Layer-common info+An indicator of two of the three triplet values ($v'_t$, $v''_t$, $v_t$). CSI report Part 2, Group 0. Remainder of layer common information. CSI report Part 2, Group 1. Information related to layers $v'_t$. CSI report Part 2, Group 2. Information related to layers $v''_t$. In some embodiments, a layer indicator two of the three triplet values ($v'_t$, $v''_t$, $v_t$) may not be required if the layer decomposition is predefined, e.g., $$\max_{t\in\{1,\,...\,,N_{TRP}\}} v'_t - \min_{\tilde{t}\in\{1,\,...\,,N_{TRP}\},\tilde{t}\neq t} v'_{\tilde{t}} \le c,$$

Also, an indicator of the size of the different groups in CSI report Part 2 may be used.

In a fourth embodiment, for multi-TRP transmission, one report per TRP may be defined, where: 1) the PMI per layer information included in CSI part 2 Group 1 may be based on one or more of NZP CSI-RS for CMR, NZP CSI-RS for interference measurement resource ("IMR"), and CSI-IM; and 2) the PMI per layer information included in CSI part 2 Group 2 may be based on one or more of NZP CSI-RS for CMR and CSI-IM. As may be appreciated, interchanging the order of the content in CSI part 2 Group 1 and CSI part 2 Group 2 is not precluded.

In some embodiments, there may be a codeword to TRP mapping. In various embodiments, under single-DCI multi-TRP, there may be complications whenever joint transmission between two TRPs t, t* would occupy more than one codeword. In such embodiments, it may be beneficial that the transmitted sequences corresponding to the layers from one TRP are transmitted through a dedicated codeword, where layers corresponding to another TRP are transmitted through a different codeword. This may be applied to all layers corresponding to one TRP, or to the first and/or last set of layers per TRP. In certain embodiments, signal sequences corresponding to different layers are multiplexed to one codeword, as long as the overall number of layers is no more than 4. Whenever the number of layers is more than 4 (e.g., but no more than 8 layers), two codewords are used, where the first codeword is assigned $\lfloor v_{all}/2 \rfloor$ layers, whereas the remaining $\lceil v_{all}/2 \rceil$ layers are assigned by the second codeword, where $v_{all}$ is the total number of layers [6]. Thereby, the difference between the number of layers handled by each codeword is no more than one. Given that, to facilitate one-to-one codeword to TRP mapping, at least for the first set of layers of each TRP t, a fifth embodiment may be used.

In the fifth embodiment, for multi-TRP transmission with single DCI, a number of layers per TRP may be constrained such that:

$$v'_t = \lceil v^t/2 \rceil, v''_t = \lfloor v^t/2 \rfloor.$$

where c=0 or 1.

The constraint may be applied to the first set of layers, the second set of layers, or the total layers per TRP t. Moreover, the number of layers in the first set of layers in each TRP may be constrained such that $v'_t \leq \delta$, where $\delta$ is the maximum number of layers multiplexed to one codeword, e.g., $\delta=4$.

In various embodiments, there may be a change to CSI priority ordering. In some embodiments, a parameter may be used for CSI report indexing in PUSCH, which represents the number of TRPs per cell or the number of CSI report groups, as found in a sixth embodiment.

In the sixth embodiment, there may be a change to CSI report priority ordering to:

$$Pri_{iCSI}(y,k,c,g,s)=2 \cdot N_{cells} \cdot N_g \cdot M_s \cdot y + N_{cells} \cdot N_g \cdot M_s \cdot k + N_g \cdot M_s \cdot c + M_s \cdot g + s,$$

where $N_g$ is the total number of the CSI report groups or TRPs per cell, and g is the corresponding index taking on values $0, 1, \ldots, N_g-1$. In certain embodiments, the priority function may be as follows:

$$Pri_{iCSI}(y,k,c,s,g)=2 \cdot N_{cells} \cdot M_s \cdot N_g \cdot y + N_{cells} \cdot M_s \cdot N_g \cdot k + M_s \cdot N_g \cdot c + N_g \cdot s + g.$$

It should be noted that parameter names other than a number of CSI report groups or a number of TRPs per cell is not precluded. In various embodiments, a CSI report may include a group of $N_g$ sub-CSI-reports or CSI components with a corresponding index taking on values $0, 1, \ldots, N_g-1$.

In some embodiments, there may be a joint design across CSI reports. In one embodiment, CSI reports may be configured with a class of codebook types belonging to Type-II. If such embodiments, layer-common information related to the codebook for TRP t may be placed in CSI report $2(t-1)+1$.

In a seventh embodiment, layer-common information corresponding to a codebook for TRP t (e.g., indicators that do not have a layer subscript such as selected spatial beam indices or tap window information) may be placed in CSI report $2(t-1)+1$ only.

In various embodiments, layer-common information related to a codebook for different TRPs with joint transmission may be placed in CSI report 1 only. In some embodiments, a beam bitmap $b_t$ of length 2L indicating a subset of spatial beams selected for each TRP t may be included in a CSI report with index $2(t-1)+1$, where nnz $(b_t)$=Lt, where nnz(x) indicates a number of entries in an arbitrary vector x with a non-zero value. $L_1+L_2+L_3 \geq 2L$ (e.g., different TRPs may reuse the same beam). Thereby, a number of beams per cell c may be reduced to Lt≤2L and may thereby reduce a CSI report size (e.g., fewer bits corresponding to the coefficients bitmap per layer may be reported). In certain embodiments, a bitmap may be used to indicate a subset of selected beams for each CSI report with indices $2(t-1)+1$ and $2(t-1)+2$ (e.g., one bitmap per report). As may be appreciated, other methods of reporting a subset of selected beams is not precluded (e.g., reporting a combinatorial value instead of a bitmap).

In an eight embodiment, for Type-II codebooks or any of its derivatives (e.g., eType-II codebook), Type-II port selection codebook or eType-II port selection codebook, only the spatial beams selected for TRP t in CSI report $2(t-1)+1$ may be reported. In such an embodiment, a length 2L beam bitmap $b_t$ in CSI report $2(t-1)+1$ may be reported, with nnz($b_t$)=Lt, where different TRPs may reuse the same beam. Coefficients corresponding to Lt beams for TRP t may only be reported.

In a ninth embodiment, for Type-II codebooks or any of its derivatives (e.g., eType-II codebook), Type-II port selection codebook or eType-II port selection codebook, a bitmap in one or more of CSI reports $2(t-1)+1$ and $2(t-1)+2$ for TRP t may be reported, wherein the bitmap indicates the indices of the spatial beams used in the CSI reports.

In some embodiments, one issue in CQI reporting is handling different CSI reporting configurations. For ease of exposition let $v't+v'^t* \leq 4$, for any TRP t, t*, and $v_t \leq 4$ for all TRPs (e.g., one codebook is used even with joint transmission. In certain embodiments, wideband ("WB") CQI may be used.

In various embodiments, WB CQI value q't (e.g., 4 bits) may be reported in CSI report $2(t-1)+1$, indicating CQI for TRP t transmission with rank v't. In certain embodiments, differential WB CQI value q"t (e.g., 2 bits) may be reported in CSI report $2(t-1)+2$, indicating CQI index offset value for TRP t single transmission with full rank vt, where the offset value is with respect to q't. In some embodiments, differential WB CQI value q't,t* (e.g., 2 bits) may be reported in CSI report $2(t-1)+1$, CSI report $2(t*-1)+1$, or both, indicating a CQI index offset under joint transmission from both TRPs t, t* with rank v't, v't*, respectively. The offset value is with respect to an arbitrary function qJTt,t*=f (q't, q't*), e.g., f (a,b)=max(a,b) or f (a,b)=⌈(a+b)/2⌉, or f (a,b)=⌊(a+b)/2⌋.

In certain embodiments, sub-band ("SB") CQI values for each CQI sub-band index w may be reported in a similar manner (e.g., reporting sub-band differential CQI values p"t(w) with respect to a function f 2(q't, q"t)) for full-rank transmission vt of TRP t to be reported in CSI report $2(t-1)+2$. In some embodiments, a sub-band differential CQI values pJTt,t*(w) may be defined with respect to qJTt,t* to be reported in CSI report $2(t-1)+1$, CSI report $2(t*-1)+1$, or both.

In a tenth embodiment, WB CQI q't and differential CQI q"t, qJTt,t* as well as p"t(w) and pJTt,t*(w) may be reported across CSI reports.

In various embodiments, if there is multi-DCI multi-TRP where $v_t \leq 4$, a codeword to TRP mapping may be one-to-one (e.g., layers corresponding to TRP t are exclusively mapped to one codeword with a corresponding WB CQI level). As may be appreciated, a WB differential CQI for joint transmission may be reported to address SINR deterioration (e.g., and possibly a CQI index drop). If so, qJTt,t*≠qJTt*,t, where qJTt,t* indicates a CQI level offset for a codeword related to TRP t due to interference from TRP t*. Thereby, qJTt,t* may be reported in CSI report $2(t-1)+1$, whereas qJTt*,t may be reported in CSI report $2(t*-1)+1$. Same may apply to pJTt,t*(w), pJTt*,t (w). As may be appreciated, the same behavior applies whenever the codeword to TRP mapping is one-to-one, even under single-DCI multi-TRP.

In an eleventh embodiment, for multi-DCI multi-TRP or under single-DCI multi-TRP with one-to-one codeword to TRP mapping, qJTt,t*≠qJTt*,t, and pJTt,t*(w)≠pJTt*,t (w) and hence qJTt,t*, pJTt,t*(w) may need to be reported in CSI report $2(t-1)+1$, whereas qJTt*,t, pJTt*,t (w) may be reported in CSI report $2(t*-1)+1$.

As may be appreciated, to incorporate a WB differential CQI, a type of CQI format indicator may be used to accommodate differential WB CQI values (e.g., additional values for a parameter cqi-FormatIndicator may be introduced—cqi-FormatIndicator="DiffwidebandCQI"). In certain embodiments, an additional CQI format indicator may be used to reflect both differential WB and SB reporting (e.g., cqi-FormatIndicator="DiffsubbandCQI").

In a twelfth embodiment, beside the current values "widebandCQI" and "subbandCQI", additional values for parameter cqi-FormatIndicator may be used to accommodate WB differential CQI reporting (e.g., cqi-FormatIndicator="DiffwidebandCQI"), and possibly SB differential CQI reporting (e.g., cqi-FormatIndicator="DiffsubbandCQI").

In some embodiments, there may be a hypothesis reduction. Such embodiments may facilitate improving the efficiency of CSI reporting by using CQI information to reduce a size of the aggregation of CSI reports resulting from multi-TRP transmission. Given that a UE has sufficient knowledge of a channel from all TRPs, it may be in a better position to select the best hypotheses (e.g., best transmission schemes based on some metric). However, due to other considerations on the network side, it may not be in the network's favor that a UE solely selects a best hypothesis. For instance, one approach that may reduce an overall CSI feedback overhead is that a UE only reports CSI feedback related to a subset of the hypotheses. For example, assume that a UE may only report CSI feedback related to single transmission with TRP 1, or joint transmission between TRP 1, 2 or joint transmission between TRP 2, 3 (e.g., a total of 3 hypotheses). If so, the UE may only feedback CSI reports 1, 2, 3, 5. The UE may then have to report the selected hypotheses to the network to avoid ambiguity. Although such an approach may reduce the overall CSI feedback overhead by roughly ⅓ of its size, it deprives the network from getting the chance to do hypothesis selection based on network traffic or other resource allocation considerations. This may be called "hard channel hypothesis reduction."

In various embodiments, there may be a balance between hard hypothesis reduction and full CSI feedback reporting. In such embodiments, explicit signaling of a selected hypothesis from the UE to the network may not be necessary. This may be called "soft channel hypothesis reduction" and may be based on only omitting a subset of a CSI report corresponding to unfavorable hypotheses, based on a reported CQI value. For instance, this embodiment may be as follows: 1) divide the CSI reports into two groups based on the CQI values corresponding to different hypotheses— the threshold may depend on other parameters (e.g., reported rank per report); 2) a CSI report that satisfies a threshold test is fully reported; 3) CSI reports that do not satisfy the threshold test may be partially reported—for instance, a) only CSI Part 1 of the CSI report is fed back; b) CSI Part 1+CSI Part 2, Group 0 of the CSI report is fed back; and c) CSI Part 1+CSI Part 2, Group 0+CSI Part 2, Group 1 of the CSI report is fed back; and 4) assume there are K CSI reports that correspond to H channel and/or interference hypotheses—the classification of the CSI reports to the two groups may be based on one (or a combination) of the following: a) $\lceil \alpha K \rceil$ CSI reports are fully fed back, whereas $\lceil (1-\alpha)K \rceil$ CSI reports are partially fed back, where $0 \le \alpha \le 1$ is either fixed, set by a rule or RRC configured; b) CSI reports that constitute $\lceil \beta H \rceil$ of the channel and/or interference hypotheses are fully fed back, whereas the remainder of CSI reports are partially fed back, where $0 \le \beta \le 1$ is either fixed, set by a rule or RRC configured; and c) CSI reports that constitute a channel and/or interference hypothesis whose effective WB CQI index is above or equal to a threshold value $\gamma$ are fully fed back, whereas the remainder of the CSI reports are partially fed back. It should be noted that a ceiling operator $\lceil \bullet \rceil$ may be replaced with floor $\lfloor \bullet \rfloor$ or round <•> operators.

In some embodiments, a CSI report classification may be made into two groups and may be instructed by the network using additional fields corresponding to a CSI trigger state (e.g., CSIAperiodicTriggerState), implicitly using a predefined rule on the CSI report ID, or via introducing a higher layer parameter (e.g., RRC parameter). In various embodiments, other methods in which the network enforces CSI report classification are not precluded.

In a thirteenth embodiment, K CSI reports may be classified into two possibly disjoint groups of size K1 and K2 each, where K1+K2=K. The CSI reports belonging to the first group are fully reported, whereas the CSI reports belonging to the second group are partially reported, or otherwise fully omitted. The CSI reports classification may be UE triggered, based on the reported rank per CSI report, the values of the reported CQI indices, or both. In certain embodiments, CSI report classification may be network triggered, based on a CSI trigger state reported to a user, CSI report ID, or both. As may be appreciated, other basis which may help in the CSI reports classification process are not precluded.

In some embodiments, there may be a common rotation parameter. In various embodiments, a reported CQI value may correspond to precoding matrices (e.g., codebooks) for different layers in more than one CSI report. A sequence of the reports may be generated so that one report may be combined only with one previous report. However, a report may be combined with any of the subsequent CSI reports. Consider the following example, given a sequence of CSI reports, if only the following CSI report combination pairs are allowed (1,2), (2,3), (1,4), (2,5), (3,6) then we can see that either CSI report 2 or CSI report 3 may be combined with only one previous report (e.g., CSI report 1 and CSI report 2, respectively). However, CSI report 2 may be combined with more than one subsequent report (e.g., CSI report 3 and CSI report 5). In such situations, a UE first searches for a precoding matrix of a given CSI report assuming that report is combined with only a previous CSI report in the list and optimizes its corresponding precoding vectors accordingly. It should be noted that the first report does not have a prior report and hence it optimizes corresponding vectors of the precoding matrix, assuming that its corresponding layers may not be combined with any layers corresponding to another report.

Figure 8:
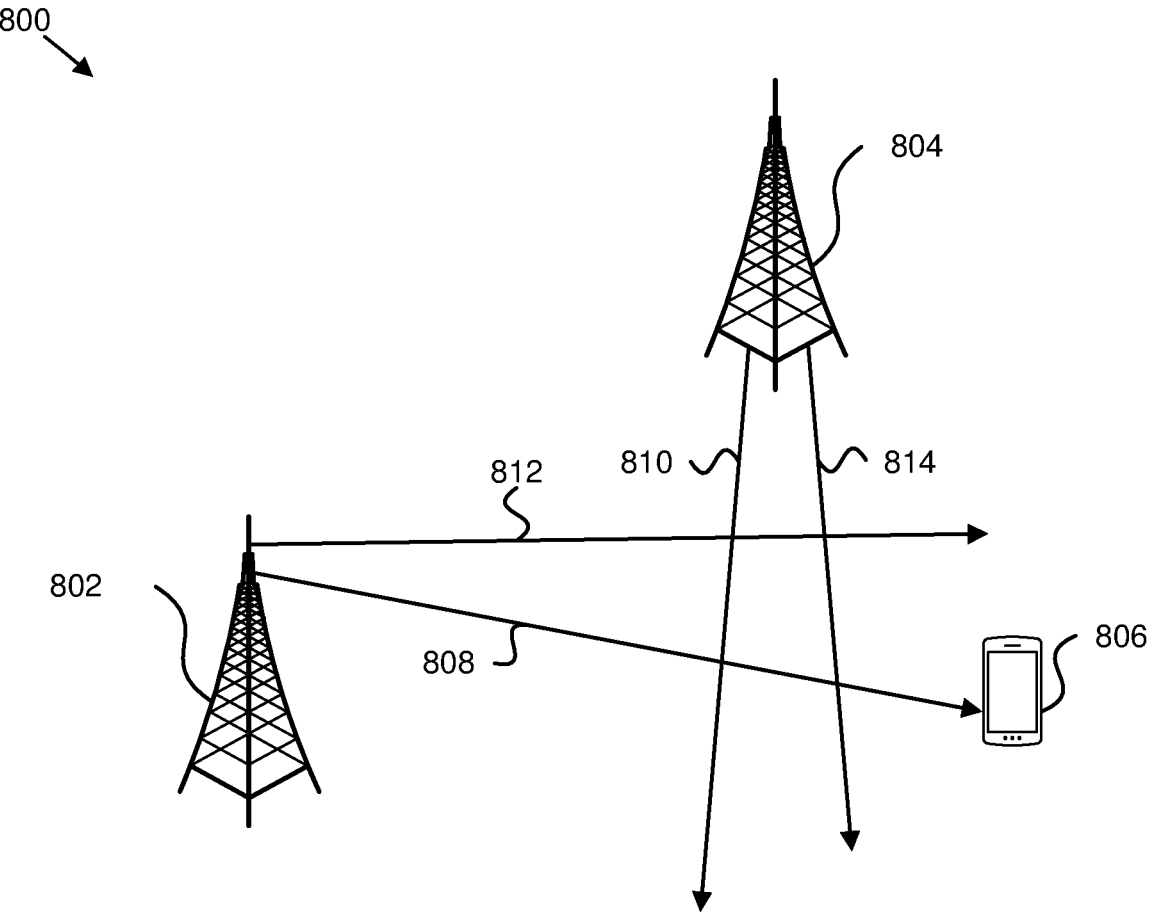
FIG. 8 is a schematic block diagram illustrating one embodiment of two TRPs jointly transmitting data to one user equipment using a single codeword.

FIG. 8 is a schematic block diagram 800 illustrating one embodiment of two TRPs jointly transmitting data to one user equipment using a single codeword. Specifically, the schematic block diagram 800 includes a first TRP 802, a second TRP 804, and a UE 806. Precoding matrices $P_{A1}$ 808, $P_{A2}$ 810, $P^r_{A1}$ 812, and $P^r_{A2}$ 814 are transmitted as illustrated.

Specifically, the precoding matrix $P_{A1}$ is indicated in CSI report 1, which is not constrained with the precoding matrices of any other report. The precoding matrix $P_{A2}$ in CSI report 3 may be designed with the constraint of being as close to "orthogonal" to $P_{A1}$ as possible. This may result in qualitative differences between the layers corresponding to CSI report 1 and CSI report 3. If the layers across both reports are multiplexed to a single codeword, performance loss may be incurred. To minimize a qualitative difference between the performance of the layers corresponding to the two CSI reports and maximize the CQI level under joint transmission, it may be better to have a rotation transformation $\Lambda$ such that $$P^r_{A1} = \Lambda P_{A1} \text{ and } P^r_{A2} = \Lambda P_{A2},$$

where $\Lambda$ is a diagonal matrix of the form $$\Lambda = kron\left(\text{diag}\left(\{\exp(j2\pi n_1 \theta_1)\}_{n_1=0}^{N_1-1}\right), \text{diag}\left(\{\exp(j2\pi n_2 \theta_2)\}_{n_2=0}^{N_2-1}\right)\right),$$

where kron(A,B) is the Kronecker product of two matrices A, B, $\exp(\alpha)=e^{\alpha}$ and $$\mathrm{diag}(\{a_i\}_{i=1}^n)$$

is a diagonal matrix whose diagonal entries are $a_1, \ldots, a_n$. This may imply that during $P_{A2}$ reporting, best rotation factors $\theta_1$ and $\theta_2$ may be reported. This $\theta_1$ and $\theta_2$ reporting may be similar to $l_i$ and $m_i$, but with a potential different range of values. The same rotation factor may be applied to all the layers of this CSI report and the previous CSI reports it is combined with, whether the CSI reports belong to the same TRP or different TRPs. Since there is only one previous report, a given CSI report may be combined with it, there may be no confusion on what rotation factor is used for any joint transmission combination.

As may be appreciated, if both CSI reports belong to the same TRP, one way such rotation may be implied is that a rotation factor in one CSI report overrides that in a prior CSI report (e.g., for eType-II codebook). For example, the field $i_{1,1}$ in CSI report $2(t-1)+2$ may override the field $i_{1,1}$ corresponding to CSI report $2(t-1)+2$. As may be appreciated, the same may apply to the beam indicator field $i_{1,2}$. Moreover, the possibility the rotation factor field or beam indicator field overridden across CSI reports corresponding to different TRPs may not be precluded.

In a fourteenth embodiment, reported values of parameters corresponding to one CSI report may be altered based on the reported values of another CSI report. For example, a rotation factor, a spatial beam set index, or both, reported in one CSI report may be applied to the codebook corresponding to another CSI report (e.g., a CSI report with a smaller index value). In such embodiments, this may be pursued by further rotation of a subset of the codebook parameters in one CSI report based on the rotation factor and/or spatial beam set index reported in another CSI report, or via overriding the rotation factor and/or spatial beam set index in one CSI report with the rotation factor reported in another CSI report.

In some embodiments, there may be concise CSI reporting multiplexing for NCJT Two-TRP PDSCH transmission. In various embodiments, a UE receives an uplink scheduling DCI with a non-fallback format 0_1. The DCI indicates uplink time and frequency resources upon which the device should transmit the PUSCH. The DCI contains a nonzero CSI request (e.g., 0-6 bit) used to request aperiodic CSI reporting on PUSCH.

In various embodiments, a CSI request points to an aperiodic trigger state "m" configured with an RRC parameter enable_depend_reporting set to true. In such embodiments, an aperiodic trigger state m contains "N" CSI-ReportConfig whose reportConfigId are denoted by $m_1$, $m_2$, . . . , $m_N$ respectively. CSI-ReportConfig $m_1$ has its NZP-CSI-RS resource set for channel measurement QCL'ed with the PDCCH carrying the DCI format 0_1 (e.g., indicating a main transmission TRP). This TCI state is denoted by $Q_1$. With enable_depend_reporting=True, the CSI report associated with CSI-ReportConfig $m_1$ will be denoted as Report 1. Report 1 has the highest priority among the N reports. ReportConfig $m_2$, . . . , $m_N$ are configured with NZP-CSI-RS resource sets for channel measurement whose TCI states are denoted by $Q_2, \ldots, Q_N \neq Q_1$ respectively e.g., (indicating helper TRPs to be potentially used in a two-TRP NCJT along with the main TRP). The corresponding CSI reports will be denoted as Report 2, . . . , Report N.

In some embodiments, each report carries rank information ("RI"), precoder information ("PMI"), and a channel quality indicator ("CQI") denoted by $(r_i, P_i, CQI_i)$ per Report i. Report 1 is computed under the following hypothesis: Report 1 is computed under the hypothesis $H_1$: single DCI single PDSCH transmission with TCI codepoint having single TCI state $Q_1$. With enable_depend_reporting=True, the UE computes reports 2, . . . , N under the hypothesis. Report i (i=2, . . . , N) is computed under the hypothesis $H_i$: single DCI NCJT transmission with TCI codepoint $(Q_1, Q_i)$. Moreover, NZP CSI-RS resources for interlayer interference measurement have QCL info set to $Q_1$.

Since reports 2, . . . , N assume NCJT transmission, the UE reports $(r_2, \ldots, r_N) \leq 2$ to be the number of layers transmitted per TB per TCI state. The sum reported UE rank in case of NCJT transmission will be $\leq 4$. $P_2, \ldots, P_N$ and $CQI_2, \ldots, CQI_N$ are computed according to this hypothesis. For i=2, . . . , N, CSI Report i $(r_i, P_i, CQI_i)$ may be interpreted as rank $r_i$ transmission from each TRP, $P_i$ the precoder used at TRP with TCI state $Q_i$, and $CQI_i$ the desired modulation and coding rates for the TB under hypothesis $H_i$.

Finally, the UE orders the transmission hypotheses $(H_i, i=2, \ldots, N)$ in decreasing order of spectral efficiency performance to determine the priority of each report i (i=2, . . . , N) during the multiplexing on the PUSCH resources. This priority reordering may override other priorities.

In certain embodiments, a UE may implicitly determine a transmission hypotheses $H_i$ (i=2, . . . , N) (e.g., instead of using explicit RRC signaling) from QCL information for channel measurement NZP-CSI-RS resource sets for ReportConfig $m_1, m_2, \ldots, m_N$ and the rank restrictions on the corresponding CSI-RS. In some embodiments, $r_i$ and $CQI_i$ may be interpreted as differential values with respect to $r_i$ and $CQI_1$. In various embodiments, non-precoded NZP-CSI-RS transmitted from a main TRP may be combined with precoder information $P_1$ for interlayer interference measurement.

In some embodiments, a UE orders a transmission hypotheses $(H_i, i=2, \ldots, N)$ according to a predefined performance metric (e.g., L1-RSRP) to determine a priority rank of each report. In various embodiments, concise aperiodic CSI reporting on PUSCH for multi-TRP NCJT transmission may be enabled where the number of transmission hypotheses increases only linearly with the number of transmission points.

In certain embodiments, a UE first computes CSI report 1 under the following transmission hypothesis: single TRP transmission from the TRP with TCI state $Q_1$ QCLed with the reference signals for the physical downlink control channel ("PDCCH") carrying DCI format 0_1. Afterwards, the UE computes the rest of the NCJT transmission hypothesis for TCI codepoints (Q1, Qi, i=2, . . . , N) under varying assumptions of dependency on $(r_1, P_1, CQI_1)$. In various embodiments, Report 1 (e.g., single TRP Transmission hypothesis) may have the highest priority, followed by reports with decreasing order of spectral efficiency performance possibly overriding another priority ordering. This priority ordering may be relevant to multi-TRP transmission and may achieve a higher performance.

In some embodiments, a CSI report configuration for CSI feedback (e.g., CQI, PMI, RI, CRI, and/or layer index ("LI")) includes a channel measurement CSI resource set within a CSI resource setting (e.g., CSI-ResourceConfig) channel measurement, a CSI-IM resource set within a CSI resource setting for ZP interference measurement and/or a NZP CSI-RS interference CSI resource set within a CSI resource setting for NZP CSI-RS interference measurement. In various embodiments, an RRC parameter groupBasedC-SIReporting (e.g., in a CSI report configuration) may enable and/or configure multi-TRP and/or panel CSI feedback with a CSI report including a group of N_g CSI reports or sub-CSI-reports or CSI components. The channel measurement CSI resource set may include K=NTRP NZP CSI-RS resources with the NZP CSI-RS resource i including multi-port CSI-RS associated with TRP i. Similarly, the CSI-IM resource set may include K=NTRP CSI-IM resources with the CSI-IM resource i associated with TRP i. In one example, each CSI-RS resource for channel measurement is resource-wise associated with a CSI-IM resource by the ordering of the CSI-RS resource and CSI-IM resource in the corresponding resource sets with the number of CSI-RS resources for channel measurement equal to the number of CSI-IM resources. In another example, a single CSI-IM resource may be configured and associated with each of the CSI-RS resources for channel measurement (e.g., and each TRP). The NZP CSI-RS resource for channel measurement and the CSI-IM resource for interference measurement associated with TRP i may be QCLed with respect to 'QCL-TypeD'. The interference measurement NZP CSI resource set may include K=NTRP NZP CSI-RS interference IMR resources with the NZP CSI-RS resource i including multi-port interference CSI-RS associated with TRP i. The NZP CSI-RS resource for channel measurement and the NZP CSI-RS IMR resource for interference measurement associated with TRP i may be QCLed with respect to 'QCL-TypeD'.

In some embodiments, a single TRP CSI report, sub-CSI-report, and/or CSI component may be based on a channel CSI-RS channel measurement resource ("CMR"), CSI-IM, and/or NZP CSI-RS IMR associated with the TRP. In various embodiments, with a single CSI-IM resource, a channel CMR of other TRPs may be included as additional inter-layer interference. For joint transmission CSI report, sub-CSI-report, and/or a CSI component involving TRPs i and j, channel measurements may be based on CMR for TRP i and j, with interference based on the associated CSI-IM, and/or NZP CSI-RS IMR associated with the TRP i and j. In certain embodiments, a channel CMR of other TRPs (e.g., not including TRP i and j) may be included as additional inter-layer interference. In some embodiments, a number of TRPs for which CSI reports are performed may correspond to a number of NZP CSI-RS resources in a channel measurement CSI resource set. In various embodiments, a number of TRPs in joint transmission hypothesis may be limited to 2.

In some embodiments, the terms antenna, panel, and antenna panel are used interchangeably. An antenna panel may be hardware that is used for transmitting and/or receiving radio signals at frequencies lower than 6 GHz (e.g., frequency range 1 ("FR1") 0, or higher than 6 GHz (e.g., frequency range 2 ("FR2") or millimeter wave ("mm-Wave")). In certain embodiments, an antenna panel may include an array of antenna elements. Each antenna element may be connected to hardware, such as a phase shifter, that enables a control module to apply spatial parameters for transmission and/or reception of signals. The resulting radiation pattern may be called a beam, which may or may not be unimodal and may allow the device to amplify signals that are transmitted or received from spatial directions.

In various embodiments, an antenna panel may or may not be virtualized as an antenna port. An antenna panel may be connected to a baseband processing module through a radio frequency ("RF") chain for each transmission (e.g., egress) and reception (e.g., ingress) direction. A capability of a device in terms of a number of antenna panels, their duplexing capabilities, their beamforming capabilities, and so forth, may or may not be transparent to other devices. In some embodiments, capability information may be communicated via signaling or capability information may be provided to devices without a need for signaling. If information is available to other devices the information may be used for signaling or local decision making.

In some embodiments, a UE antenna panel may be a physical or logical antenna array including a set of antenna elements or antenna ports that share a common or a significant portion of a radio frequency ("RF") chain (e.g., in-phase and/or quadrature ("I/Q") modulator, analog to digital ("A/D") converter, local oscillator, phase shift network). The UE antenna panel or UE panel may be a logical entity with physical UE antennas mapped to the logical entity. The mapping of physical UE antennas to the logical entity may be up to UE implementation. Communicating (e.g., receiving or transmitting) on at least a subset of antenna elements or antenna ports active for radiating energy (e.g., active elements) of an antenna panel may require biasing or powering on of an RF chain which results in current drain or power consumption in a UE associated with the antenna panel (e.g., including power amplifier and/or low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In certain embodiments, depending on a UE's own implementation, a "UE panel" may have at least one of the following functionalities as an operational role of unit of antenna group to control its transmit ("TX") beam independently, unit of antenna group to control its transmission power independently, and/pr unit of antenna group to control its transmission timing independently. The "UE panel" may be transparent to a gNB. For certain conditions, a gNB or network may assume that a mapping between a UE's physical antennas to the logical entity "UE panel" may not be changed. For example, a condition may include until the next update or report from UE or include a duration of time over which the gNB assumes there will be no change to mapping. A UE may report its UE capability with respect to the "UE panel" to the gNB or network. The UE capability may include at least the number of "UE panels." In one embodiment, a UE may support UL transmission from one beam within a panel. With multiple panels, more than one beam (e.g., one beam per panel) may be used for UL transmission. In another embodiment, more than one beam per panel may be supported and/or used for UL transmission.

In some embodiments, an antenna port may be defined such that a channel over which a symbol on the antenna port is conveyed may be inferred from the channel over which another symbol on the same antenna port is conveyed.

In certain embodiments, two antenna ports are said to be quasi co-located ("QCL") if large-scale properties of a channel over which a symbol on one antenna port is conveyed may be inferred from the channel over which a symbol on another antenna port is conveyed. Large-scale properties may include one or more of delay spread, Doppler spread, Doppler shift, average gain, average delay, and/or spatial receive ("RX") parameters. Two antenna ports may be quasi co-located with respect to a subset of the large-scale properties and different subset of large-scale properties may be indicated by a QCL Type. For example, a qcl-Type may take one of the following values: 1) 'QCL-TypeA': {Doppler shift, Doppler spread, average delay, delay spread}; 2) 'QCL-TypeB': {Doppler shift, Doppler spread}; 3) 'QCL-TypeC': {Doppler shift, average delay}; and 4)'QCL-TypeD': {Spatial Rx parameter}.

In various embodiments, spatial RX parameters may include one or more of: angle of arrival ("AoA"), dominant AoA, average AoA, angular spread, power angular spectrum ("PAS") of AoA, average angle of departure ("AoD"), PAS of AoD, transmit and/or receive channel correlation, transmit and/or receive beamforming, and/or spatial channel correlation.

In some embodiments, an "antenna port" may be a logical port that may correspond to a beam (e.g., resulting from beamforming) or may correspond to a physical antenna on a device. In certain embodiments, a physical antenna may map directly to a single antenna port in which an antenna port corresponds to an actual physical antenna. In various embodiments, a set of physical antennas, a subset of physical antennas, an antenna set, an antenna array, or an antenna sub-array may be mapped to one or more antenna ports after applying complex weights and/or a cyclic delay to the signal on each physical antenna. The physical antenna set may have antennas from a single module or panel or from multiple modules or panels. The weights may be fixed as in an antenna virtualization scheme, such as cyclic delay diversity ("CDD"). A procedure used to derive antenna ports from physical antennas may be specific to a device implementation and transparent to other devices.

In various embodiments, a transmission configuration indicator ("TCI") state associated with a target transmission may indicate a quasi-collocation relationship between a target transmission (e.g., target RS of demodulation reference signal ("DM-RS") ports of the target transmission during a transmission occasion) and source reference signals (e.g., synchronization signal block ("SSB"), channel state information reference signal ("CSI-RS"), and/or sounding reference signal ("SRS")) with respect to quasi co-location type parameters indicated in a corresponding TCI state. A device may receive a configuration of multiple transmission configuration indicator states for a serving cell for transmissions on the serving cell.

In some embodiments, spatial relation information associated with a target transmission may indicate a spatial setting between a target transmission and a reference RS (e.g., SSB, CSI-RS, and/or SRS). For example, a UE may transmit a target transmission with the same spatial domain filter used for receiving a reference RS (e.g., DL RS such as SSB and/or CSI-RS). In another example, a UE may transmit a target transmission with the same spatial domain transmission filter used for the transmission of a RS (e.g., UL RS such as SRS). A UE may receive a configuration of multiple spatial relation information configurations for a serving cell for transmissions on a serving cell.

FIG. 9 is a flow chart diagram illustrating one embodiment of a method 900 for channel state information reporting. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

In various embodiments, the method 900 includes receiving 902 channel state information report configuration information, wherein the channel state information report configuration information comprises: information indicating one or more channel state information reference signal resource configurations associated with one or more channel state information reference signal resource sets for channel measurements, interference measurements, or a combination thereof, and information indicating that channel state information feedback corresponding to multiple points is used, wherein each point of the multiple points is associated with a non-zero power channel state information reference signal resource for channel measurement of a channel state information reference signal resource set, and at least one point of the multiple points is associated with one or more channel state information interference management resources for zero power interference measurement. In some embodiments, the method 900 includes performing 904 channel measurements using the channel state information reference signal resource set. In various embodiments, the method 900 includes generating 906 a set of channel state information reports based on the channel state information report configuration information.

In certain embodiments, each point of the multiple points corresponds to a transmission-and-reception point or a panel of a transmission-and-reception point. In some embodiments, the information indicating that channel state information feedback for multiple points is used comprises: a radio resource control parameter within the channel state information report configuration; a channel state information report quantity within the channel state information report configuration; a quasi-co-location relationship involving one or more channel state information reference signal resources within the one or more channel state information reference signal resource sets; a codepoint indicating different downlink control information states; a codebook type parameter; a codebook configuration parameter; a transmission configuration indicator codepoint from a transmission configuration comprising at least two transmission configuration indicator states; an indication of a spatial division multiplexing scheme across multiple points; or some combination thereof.

In various embodiments, a channel state information report in the set of channel state information reports comprises two parts, and a second of the two parts of the channel state information report includes two precoder matrix indicators. In one embodiment, a first precoder matrix indicator of the two precoder matrix indicators is associated with a non-zero power channel state information reference signal resource for channel measurement resource, a non-zero power channel state information reference signal resource for interference measurement resource, a channel state information interference management resource, or some combination thereof, and a second precoder matrix indicator of the two precoder matrix indicators is associated with a non-zero power channel state information reference signal for channel measurement resource, a channel state information interference management, or a combination thereof.

In certain embodiments, an absolute difference between a number of layers corresponding to a first precoder matrix indicator of the two precoder matrix indicators and a number of layers corresponding to a second precoder matrix indicator of the two precoder matrix indicators is no more than one. In some embodiments, the method 900 further comprises transmitting the set of channel state information reports in an order based on a channel state information priority function.

In various embodiments, the channel state information priority function is calculated using a formula, where a channel state information report with a lower formula value has a higher priority: $\text{Pri}_{iCSI}(y,k,c,s,g)=2 \cdot N_{cells} \cdot M_s \cdot N_g \cdot y + N_{cells} \cdot M_s \cdot N_g \cdot k + M_s \cdot N_g \cdot c + N_g \cdot s + g$, where $N_g$ is a total number of channel state information report groups, g is an index corresponding to values 0 to $N_g - 1$, s is a channel state information configuration index, $M_s$ is a maximum number of channel state information reporting configurations, c is a cell index, $N_{cells}$ is a number of serving cells, k is 0 for channel state information reports carrying a layer 1 reference signal received power or layer 1 signal to noise ratio, or otherwise 1, and y is 0 for aperiodic reports, 1 for semi-persistent reports transmitted on a physical uplink shared channel, 2 for semi-persistent reports transmitted on a physical uplink control channel, or 3 for periodic reports.

In one embodiment, a channel state information report of the set of channel state information reports that corresponds to single-point transmission has a higher priority than a channel state information report of the set of channel state information reports that corresponds to joint transmission from multiple points. In certain embodiments, channel state information that is common for a subset of two or more channel state information reports in the set of channel state information reports is reported in one channel state information report in the subset of the two or more channel state information reports. In some embodiments, the common channel state information comprises information that is common to all layers.

In various embodiments, at least one channel state information report in the set of channel state information reports comprises channel state information corresponding to a Type-II codebook, and the at least one channel state information report comprises at least one bitmap that indicates beams with non-zero coefficients included in the at least one channel state information report. In one embodiment, a channel state information report in the set of channel state information reports comprises a plurality of channel quality indicators.

In certain embodiments, values corresponding to at least one channel quality indicator of the plurality of channel quality indicators are computed in a differential manner with respect to values corresponding to another channel quality indicator in the plurality of channel quality indicators. In some embodiments, the at least one channel quality indicator that is computed in a differential manner is configured with a channel quality indicator format indicator corresponding to a differential channel quality indicator format.

FIG. 10 is a flow chart diagram illustrating another embodiment of a method 1000 for channel state information reporting. In some embodiments, the method 1000 is performed by an apparatus, such as the remote unit 102. In certain embodiments, the method 1000 may be performed by a processor executing program code, for example, a microcontroller, a microprocessor, a CPU, a GPU, an auxiliary processing unit, a FPGA, or the like.

In various embodiments, the method 1000 includes receiving 1002 channel state information report configuration information, wherein the channel state information report configuration information comprises: information indicating one or more channel state information channel state information reference signal resource configurations associated with a channel state information channel state information reference signal resource set for channel measurement and a channel state information interference management resource set for interference measurement; and information indicating that channel state information feedback corresponding to multiple points is used, wherein each point of the multiple points is associated with a non-zero power channel state information reference signal resource for channel measurement of the channel state information reference signal resource set, and the multiple points are associated with one or more channel state information interference management resources for interference measurement of the channel state information interference management resource set. In some embodiments, the method 1000 includes generating 1004 a set of channel state information reports based on the channel state information report configuration information, wherein each channel state information report in the set of channel state information reports comprises two parts. In various embodiments, the method 1000 includes reporting 1006 the set of channel state information reports to the network.

In certain embodiments, each point of the multiple points corresponds to a transmission-and-reception point or a panel of a transmission-and-reception point. In some embodiments, the information indicating that channel state information feedback for multiple points is used comprises: a radio resource control parameter within the channel state information report configuration; a channel state information report quantity within the channel state information report configuration; a quasi-co-location relationship involving one or more channel state information reference signal resources within the channel state information reference signal resource set; a codepoint indicating different downlink control information states; a codebook type parameter; a codebook configuration parameter; a transmission configuration indicator codepoint from a transmission configuration comprising at least two transmission configuration indicator states; an indication of a spatial division multiplexing scheme across multiple points; or some combination thereof. In various embodiments, each point of the multiple points is associated with a channel state information interference management resource for interference measurement.

In one embodiment, each channel state information reference signal resource for channel measurement is resource-wise associated with a channel state information interference management resource by the ordering of the channel state information reference signal resource and channel state information interference management resource in corresponding resource sets, and a number of channel state information reference signal resources for channel measurement is equal to a number of channel state information interference management resources. In certain embodiments, the non-zero power channel state information reference signal resource for channel measurement and the channel state information interference management resource for interference measurement associated with a same point are quasi-co-located with respect to 'QCL-TypeD'. In some embodiments, the multiple points are associated with at least one non-zero power channel state information reference signal resource for interference measurement.

In various embodiments, the set of channel state information reports comprises two subsets of channel state information reports, a first of the two subsets of channel state information reports includes at least one channel state information report corresponding to single-point transmission, and a second of the two subsets of channel state information reports includes at least one channel state information report corresponding to joint transmission from multiple points. In one embodiment, a partition of channel state information that is the same for two channel state information reports associated with different subsets of the two subsets of channel state information reports is reported in one of the two channel state information reports.

In certain embodiments, a subset of one or more channel state information reports of the set of channel state information reports is identified. In some embodiments, the one or more channel state information reports of the subset of channel state information reports are identified based on: a network configuration; identifications of the channel state information reports; user equipment feedback; a function of rank indicators of the one or more channel state information reports; a function of channel quality indicators of the one or more channel state information reports; or some combination thereof. In various embodiments, the one or more channel state information reports of the subset of channel state information reports are partially reported.

In one embodiment, a first part of the two parts of the one or more channel state information reports of the subset of channel state information reports are reported, and a second part of the two parts of the one or more channel state information reports of the subset of channel state information reports are not reported. In certain embodiments, a first part of the two parts and a first portion of a second part of the two parts of the one or more channel state information reports of the subset of channel state information reports are reported, and a last portion of the second part of two parts of the one or more channel state information reports of the subset of channel state information reports are not reported. In some embodiments, the one or more channel state information reports of the subset of channel state information reports are not reported.

FIG. 11 is a flow chart diagram illustrating a further embodiment of a method 1100 for channel state information reporting. In some embodiments, the method 1100 is performed by an apparatus, such as the remote unit 102. In certain embodiments, the method 1100 may be performed by a processor executing program code, for example, a micro-controller, a microprocessor, a CPU, a GPU, an auxiliary processing unit, a FPGA, or the like.

In various embodiments, the method 1100 includes receiving 1102 channel state information report configuration information, wherein the channel state information report configuration information comprises: information indicating one or more channel state information-reference signal resource configurations associated with at least one non-zero power channel state information reference signal resource set for channel measurement; and information indicating that the channel state information report configuration corresponding to multiple points is used, wherein the multiple points are associated with a primary group of points or a secondary group of points. In some embodiments, the method 1100 includes performing 1104 channel measurements using the at least one non-zero power channel state information reference signal resource set. In various embodiments, the method 1100 includes generating 1106 a set of channel state information reports based on the channel state information report configuration information.

In certain embodiments, each point of the multiple points corresponds to a transmission-and-reception point or a panel of a transmission-and-reception point. In some embodiments, the information indicating that channel state information feedback for multiple points is used comprises: a radio resource control parameter within the channel state information report configuration; a channel state information report quantity within the channel state information report configuration; a quasi-co-location relationship involving one or more channel state information reference signal resources within that at least one channel state information reference signal resource set; a codepoint indicating different downlink control information states; a codebook type parameter; a codebook configuration parameter; a transmission configuration indicator codepoint from a transmission configuration comprising at least two transmission configuration indicator states; an indication of a spatial division multiplexing scheme across multiple points; or some combination thereof.

In various embodiments, the primary group of points comprises one point, and the secondary group of points comprises at least one point. In one embodiment, joint transmission from two points corresponds to a primary point and a secondary point in the primary group of points and the secondary group of points. In certain embodiments, the primary point is associated with a non-zero power channel state information reference signal resource for channel measurement that is quasi-co-located with a physical downlink control channel.

In some embodiments, a rank indicator value carried in a channel state information report corresponding to the secondary point channel state information feedback does not exceed two. In various embodiments, each point of the multiple points is associated with a non-zero power channel state information reference signal resource for channel measurement of the channel state information reference signal resource set. In one embodiment, one or more non-zero power channel state information reference signal resources for interference measurement are quasi-co-located with the non-zero power channel state information reference signal resource for channel measurement.

In certain embodiments, the method 1100 further comprises transmitting the set of channel state information reports in an order based on a channel state information priority function, wherein the channel state information priority function is calculated using a formula, where a channel state information report with a lower formula value has a higher priority: $\mathrm{Pri}_{iCSI}(y,k,c,s,g)=2 \cdot N_{cells} \cdot M_s \cdot N_g \cdot y + N_{cells} \cdot M_s \cdot N_g \cdot k + M_s \cdot N_g \cdot c + N_g \cdot s + g$, where $N_g$ is a total number of channel state information report groups, g is an index corresponding to values 0 to $N_g-1$, s is a channel state information configuration index, $M_s$ is a maximum number of channel state information reporting configurations, c is a cell index, $N_{cells}$ is a number of serving cells, k is 0 for channel state information reports carrying a layer 1 reference signal received power or layer 1 signal to noise ratio, or otherwise 1, and y is 0 for aperiodic reports, 1 for semi-persistent reports transmitted on a physical uplink shared channel, 2 for semi-persistent reports transmitted on a physical uplink control channel, or 3 for periodic reports.

In some embodiments, a channel state information report of the set of channel state information reports that corresponds to single-point transmission has a higher priority than a channel state information report of the set of channel state information reports that corresponds to joint transmission from multiple points. In various embodiments, a channel state information report corresponding to single-point transmission from the primary point has a higher priority compared to the channel state information reports in the set of channel state information reports.

In one embodiment, a method comprises: receiving channel state information report configuration information, wherein the channel state information report configuration information comprises: information indicating one or more channel state information reference signal resource configurations associated with one or more channel state information reference signal resource sets for channel measurements, interference measurements, or a combination thereof; and information indicating that channel state information feedback corresponding to multiple points is used, wherein each point of the multiple points is associated with a non-zero power channel state information reference signal resource for channel measurement of a channel state information reference signal resource set, and at least one point of the multiple points is associated with one or more channel state information interference management resources for zero power interference measurement; performing channel measurements using the channel state information reference signal resource set; and generating a set of channel state information reports based on the channel state information report configuration information.

In certain embodiments, each point of the multiple points corresponds to a transmission-and-reception point or a panel of a transmission-and-reception point.

In some embodiments, the information indicating that channel state information feedback for multiple points is used comprises: a radio resource control parameter within the channel state information report configuration; a channel state information report quantity within the channel state information report configuration; a quasi-co-location relationship involving one or more channel state information reference signal resources within the one or more channel state information reference signal resource sets; a codepoint indicating different downlink control information states; a codebook type parameter; a codebook configuration parameter; a transmission configuration indicator codepoint from a transmission configuration comprising at least two transmission configuration indicator states; an indication of a spatial division multiplexing scheme across multiple points; or some combination thereof.

In various embodiments, a channel state information report in the set of channel state information reports comprises two parts, and a second of the two parts of the channel state information report includes two precoder matrix indicators.

In one embodiment, a first precoder matrix indicator of the two precoder matrix indicators is associated with a non-zero power channel state information reference signal resource for channel measurement resource, a non-zero power channel state information reference signal resource for interference measurement resource, a channel state information interference management resource, or some combination thereof, and a second precoder matrix indicator of the two precoder matrix indicators is associated with a non-zero power channel state information reference signal for channel measurement resource, a channel state information interference management, or a combination thereof.

In certain embodiments, an absolute difference between a number of layers corresponding to a first precoder matrix indicator of the two precoder matrix indicators and a number of layers corresponding to a second precoder matrix indicator of the two precoder matrix indicators is no more than one.

In some embodiments, the method further comprises transmitting the set of channel state information reports in an order based on a channel state information priority function.

In various embodiments, the channel state information priority function is calculated using a formula, where a channel state information report with a lower formula value has a higher priority: $Pri_{iCSI}(y,k,c,s,g) = 2 \cdot N_{cells} \cdot M_s \cdot N_g \cdot y + N_{cells} \cdot M_s \cdot N_g \cdot k + M_s \cdot N_g \cdot c + N_g \cdot s + g$, where $N_g$ is a total number of channel state information report groups, g is an index corresponding to values 0 to $N_g-1$, s is a channel state information configuration index, $M_s$ is a maximum number of channel state information reporting configurations, c is a cell index, $N_{cells}$ is a number of serving cells, k is 0 for channel state information reports carrying a layer 1 reference signal received power or layer 1 signal to noise ratio, or otherwise 1, and y is 0 for aperiodic reports, 1 for semi-persistent reports transmitted on a physical uplink shared channel, 2 for semi-persistent reports transmitted on a physical uplink control channel, or 3 for periodic reports.

In one embodiment, a channel state information report of the set of channel state information reports that corresponds to single-point transmission has a higher priority than a channel state information report of the set of channel state information reports that corresponds to joint transmission from multiple points.

In certain embodiments, channel state information that is common for a subset of two or more channel state information reports in the set of channel state information reports is reported in one channel state information report in the subset of the two or more channel state information reports.

In some embodiments, the common channel state information comprises information that is common to all layers.

In various embodiments, at least one channel state information report in the set of channel state information reports comprises channel state information corresponding to a Type-II codebook, and the at least one channel state information report comprises at least one bitmap that indicates beams with non-zero coefficients included in the at least one channel state information report.

In one embodiment, a channel state information report in the set of channel state information reports comprises a plurality of channel quality indicators.

In certain embodiments, values corresponding to at least one channel quality indicator of the plurality of channel quality indicators are computed in a differential manner with respect to values corresponding to another channel quality indicator in the plurality of channel quality indicators.

In some embodiments, the at least one channel quality indicator that is computed in a differential manner is configured with a channel quality indicator format indicator corresponding to a differential channel quality indicator format.

In one embodiment, an apparatus comprises: a receiver configured to receive channel state information report configuration information, wherein the channel state information report configuration information comprises: information indicating one or more channel state information reference signal resource configurations associated with one or more channel state information reference signal resource sets for channel measurements, interference measurements, or a combination thereof, and information indicating that channel state information feedback corresponding to multiple points is used, wherein each point of the multiple points is associated with a non-zero power channel state information reference signal resource for channel measurement of a channel state information reference signal resource set, and at least one point of the multiple points is associated with one or more channel state information interference management resources for zero power interference measurement; and a processor configured to: perform channel measurements using the channel state information reference signal resource set; and generate a set of channel state information reports based on the channel state information report configuration information, wherein each point of the multiple points corresponds to a transmission-and-reception point or a panel of a transmission-and-reception point, and wherein the information indicating that channel state information feedback for multiple points is used comprises: a radio resource control parameter within the channel state information report configuration; a channel state information report quantity within the channel state information report configuration; a quasi-co-location relationship involving one or more channel state information reference signal resources within the one or more channel state information reference signal resource sets; a codepoint indicating different downlink control information states; a codebook type parameter; a codebook configuration parameter; a transmission configuration indicator codepoint from a transmission configuration comprising at least two transmission configuration indicator states; an indication of a spatial division multiplexing scheme across multiple points; or some combination thereof.

In certain embodiments, a channel state information report in the set of channel state information reports comprises two parts, and a second of the two parts of the channel state information report includes two precoder matrix indicators, a first precoder matrix indicator of the two precoder matrix indicators is associated with a non-zero power channel state information reference signal resource for channel measurement resource, a non-zero power channel state information reference signal resource for interference measurement resource, a channel state information interference management resource, or some combination thereof, and a second precoder matrix indicator of the two precoder matrix indicators is associated with a non-zero power channel state information reference signal for channel measurement resource, a channel state information interference management, or a combination thereof, and an absolute difference between a number of layers corresponding to a first precoder matrix indicator of the two precoder matrix indicators and a number of layers corresponding to a second precoder matrix indicator of the two precoder matrix indicators is no more than one.

In some embodiments, the apparatus further comprises a transmitter configured to transmit the set of channel state information reports in an order based on a channel state information priority function, wherein a channel state information report of the set of channel state information reports that corresponds to single-point transmission has a higher priority than a channel state information report of the set of channel state information reports that corresponds to joint transmission from multiple points, and the channel state information priority function is calculated using a formula, where a channel state information report with a lower formula value has a higher priority: $\text{Pri}_{iCSI}(y,k,c,s,g) = 2 \cdot N_{cells} \cdot M_s \cdot N_g \cdot y + N_{cells} \cdot M_s \cdot N_g \cdot k + M_s \cdot N_g \cdot c + N_g \cdot s + g$, where $N_g$ is a total number of channel state information report groups, g is an index corresponding to values 0 to $N_g-1$, s is a channel state information configuration index, $M_s$ is a maximum number of channel state information reporting configurations, c is a cell index, $N_{cells}$ is a number of serving cells, k is 0 for channel state information reports carrying a layer 1 reference signal received power or layer 1 signal to noise ratio, or otherwise 1, and y is 0 for aperiodic reports, 1 for semi-persistent reports transmitted on a physical uplink shared channel, 2 for semi-persistent reports transmitted on a physical uplink control channel, or 3 for periodic reports.

In various embodiments, channel state information that is common for a subset of two or more channel state information reports in the set of channel state information reports is reported in one channel state information report in the subset of the two or more channel state information reports.

In one embodiment, at least one channel state information report in the set of channel state information reports comprises channel state information corresponding to a Type-II codebook, and the at least one channel state information report comprises at least one bitmap that indicates beams with non-zero coefficients included in the at least one channel state information report, a channel state information report in the set of channel state information reports comprises a plurality of channel quality indicators, values corresponding to at least one channel quality indicator of the plurality of channel quality indicators are computed in a differential manner with respect to values corresponding to another channel quality indicator in the plurality of channel quality indicators, and the at least one channel quality indicator that is computed in a differential manner is configured with a channel quality indicator format indicator corresponding to a differential channel quality indicator format.

In one embodiment, a method comprises: receiving channel state information report configuration information, wherein the channel state information report configuration information comprises: information indicating one or more channel state information channel state information reference signal resource configurations associated with a channel state information channel state information reference signal resource set for channel measurement and a channel state information interference management resource set for interference measurement; and information indicating that channel state information feedback corresponding to multiple points is used, wherein each point of the multiple points is associated with a non-zero power channel state information reference signal resource for channel measurement of the channel state information reference signal resource set, and the multiple points are associated with one or more channel state information interference management resources for interference measurement of the channel state information interference management resource set; generating a set of channel state information reports based on the channel state information report configuration information, wherein each channel state information report in the set of channel state information reports comprises two parts; and reporting the set of channel state information reports to the network.

In certain embodiments, each point of the multiple points corresponds to a transmission-and-reception point or a panel of a transmission-and-reception point.

In some embodiments, the information indicating that channel state information feedback for multiple points is used comprises: a radio resource control parameter within the channel state information report configuration; a channel state information report quantity within the channel state information report configuration; a quasi-co-location relationship involving one or more channel state information reference signal resources within the channel state information reference signal resource set; a codepoint indicating different downlink control information states; a codebook type parameter; a codebook configuration parameter; a transmission configuration indicator codepoint from a transmission configuration comprising at least two transmission configuration indicator states; an indication of a spatial division multiplexing scheme across multiple points; or some combination thereof.

In various embodiments, each point of the multiple points is associated with a channel state information interference management resource for interference measurement.

In one embodiment, each channel state information reference signal resource for channel measurement is resource-wise associated with a channel state information interference management resource by the ordering of the channel state information reference signal resource and channel state information interference management resource in corresponding resource sets, and a number of channel state information reference signal resources for channel measurement is equal to a number of channel state information interference management resources.

In certain embodiments, the non-zero power channel state information reference signal resource for channel measurement and the channel state information interference management resource for interference measurement associated with a same point are quasi-co-located with respect to 'QCL-TypeD'.

In some embodiments, the multiple points are associated with at least one non-zero power channel state information reference signal resource for interference measurement.

In various embodiments, the set of channel state information reports comprises two subsets of channel state information reports, a first of the two subsets of channel state information reports includes at least one channel state information report corresponding to single-point transmission, and a second of the two subsets of channel state information reports includes at least one channel state information report corresponding to joint transmission from multiple points.

In one embodiment, a partition of channel state information that is the same for two channel state information reports associated with different subsets of the two subsets of channel state information reports is reported in one of the two channel state information reports.

In certain embodiments, a subset of one or more channel state information reports of the set of channel state information reports is identified.

In some embodiments, the one or more channel state information reports of the subset of channel state information reports are identified based on: a network configuration; identifications of the channel state information reports; user equipment feedback; a function of rank indicators of the one or more channel state information reports; a function of channel quality indicators of the one or more channel state information reports; or some combination thereof.

In various embodiments, the one or more channel state information reports of the subset of channel state information reports are partially reported.

In one embodiment, a first part of the two parts of the one or more channel state information reports of the subset of channel state information reports are reported, and a second part of the two parts of the one or more channel state information reports of the subset of channel state information reports are not reported.

In certain embodiments, a first part of the two parts and a first portion of a second part of the two parts of the one or more channel state information reports of the subset of channel state information reports are reported, and a last portion of the second part of two parts of the one or more channel state information reports of the subset of channel state information reports are not reported.

In some embodiments, the one or more channel state information reports of the subset of channel state information reports are not reported.

In one embodiment, an apparatus comprises: a receiver configured to receive channel state information report configuration information, wherein the channel state information report configuration information comprises: information indicating one or more channel state information channel state information reference signal resource configurations associated with a channel state information channel state information reference signal resource set for channel measurement and a channel state information interference management resource set for interference measurement; and information indicating that channel state information feedback corresponding to multiple points is used, wherein each point of the multiple points is associated with a non-zero power channel state information reference signal resource for channel measurement of the channel state information reference signal resource set, the multiple points are associated with one or more channel state information interference management resources for interference measurement of the channel state information interference management resource set, and each point of the multiple points corresponds to a transmission-and-reception point or a panel of a transmission-and-reception point; and a processor configured to: generate a set of channel state information reports based on the channel state information report configuration information, wherein each channel state information report in the set of channel state information reports comprises two parts; and report the set of channel state information reports to the network.

In certain embodiments, the information indicating that channel state information feedback for multiple points is used comprises: a radio resource control parameter within the channel state information report configuration; a channel state information report quantity within the channel state information report configuration; a quasi-co-location relationship involving one or more channel state information reference signal resources within the channel state information reference signal resource set; a codepoint indicating different downlink control information states; a codebook type parameter; a codebook configuration parameter; a transmission configuration indicator codepoint from a transmission configuration comprising at least two transmission configuration indicator states; an indication of a spatial division multiplexing scheme across multiple points; or some combination thereof.

In some embodiments, each point of the multiple points is associated with a channel state information interference management resource for interference measurement, each channel state information reference signal resource for channel measurement is resource-wise associated with a channel state information interference management resource by the ordering of the channel state information reference signal resource and channel state information interference management resource in corresponding resource sets, a number of channel state information reference signal resources for channel measurement is equal to a number of channel state information interference management resources, and the non-zero power channel state information reference signal resource for channel measurement and the channel state information interference management resource for interference measurement associated with a same point are quasi-co-located with respect to 'QCL-TypeD'.

In various embodiments, the set of channel state information reports comprises two subsets of channel state information reports, a first of the two subsets of channel state information reports includes at least one channel state information report corresponding to single-point transmission, a second of the two subsets of channel state information reports includes at least one channel state information report corresponding to joint transmission from multiple points, and a partition of channel state information that is the same for two channel state information reports associated with different subsets of the two subsets of channel state information reports is reported in one of the two channel state information reports.

In one embodiment, a subset of one or more channel state information reports of the set of channel state information reports is identified, and the one or more channel state information reports of the subset of channel state information reports are identified based on: a network configuration; identifications of the channel state information reports; user equipment feedback; a function of rank indicators of the one or more channel state information reports; a function of channel quality indicators of the one or more channel state information reports; or some combination thereof, wherein the one or more channel state information reports of the subset of channel state information reports are partially reported, and the one or more channel state information reports of the subset of channel state information reports are not reported, and wherein: a first part of the two parts of the one or more channel state information reports of the subset of channel state information reports are reported, and a second part of the two parts of the one or more channel state information reports of the subset of channel state information reports are not reported; or a first part of the two parts and a first portion of a second part of the two parts of the one or more channel state information reports of the subset of channel state information reports are reported, and a last portion of the second part of two parts of the one or more channel state information reports of the subset of channel state information reports are not reported.

In one embodiment, a method comprises: receiving channel state information report configuration information, wherein the channel state information report configuration information comprises: information indicating one or more channel state information-reference signal resource configurations associated with at least one non-zero power channel state information reference signal resource set for channel measurement; and information indicating that the channel state information report configuration corresponding to multiple points is used, wherein the multiple points are associated with a primary group of points or a secondary group of points; performing channel measurements using the at least one non-zero power channel state information reference signal resource set; and generating a set of channel state information reports based on the channel state information report configuration information.

In certain embodiments, each point of the multiple points corresponds to a transmission-and-reception point or a panel of a transmission-and-reception point.

In some embodiments, the information indicating that channel state information feedback for multiple points is used comprises: a radio resource control parameter within the channel state information report configuration; a channel state information report quantity within the channel state information report configuration; a quasi-co-location relationship involving one or more channel state information reference signal resources within that at least one channel state information reference signal resource set; a codepoint indicating different downlink control information states; a codebook type parameter; a codebook configuration parameter; a transmission configuration indicator codepoint from a transmission configuration comprising at least two transmission configuration indicator states; an indication of a spatial division multiplexing scheme across multiple points; or some combination thereof.

In various embodiments, the primary group of points comprises one point, and the secondary group of points comprises at least one point.

In one embodiment, joint transmission from two points corresponds to a primary point and a secondary point in the primary group of points and the secondary group of points.

In certain embodiments, the primary point is associated with a non-zero power channel state information reference signal resource for channel measurement that is quasi-co-located with a physical downlink control channel.

In some embodiments, a rank indicator value carried in a channel state information report corresponding to the secondary point channel state information feedback does not exceed two.

In various embodiments, each point of the multiple points is associated with a non-zero power channel state information reference signal resource for channel measurement of the channel state information reference signal resource set.

In one embodiment, one or more non-zero power channel state information reference signal resources for interference measurement are quasi-co-located with the non-zero power channel state information reference signal resource for channel measurement.

In certain embodiments, the method further comprises transmitting the set of channel state information reports in an order based on a channel state information priority function, wherein the channel state information priority function is calculated using a formula, where a channel state information report with a lower formula value has a higher priority: $\text{Pri}_{iCSI}(y,k,c,s,g)=2 \cdot N_{cells} \cdot M_s \cdot N_g \cdot y + N_{cells} \cdot M_s \cdot N_g \cdot k + M_s \cdot N_g \cdot c + N_g \cdot s + g$, where $N_g$ is a total number of channel state information report groups, g is an index corresponding to values 0 to $N_g-1$, s is a channel state information configuration index, $M_s$ is a maximum number of channel state information reporting configurations, c is a cell index, $N_{cells}$ is a number of serving cells, k is 0 for channel state information reports carrying a layer 1 reference signal received power or layer 1 signal to noise ratio, or otherwise 1, and y is 0 for aperiodic reports, 1 for semi-persistent reports transmitted on a physical uplink shared channel, 2 for semi-persistent reports transmitted on a physical uplink control channel, or 3 for periodic reports.

In some embodiments, a channel state information report of the set of channel state information reports that corresponds to single-point transmission has a higher priority than a channel state information report of the set of channel state information reports that corresponds to joint transmission from multiple points.

In various embodiments, a channel state information report corresponding to single-point transmission from the primary point has a higher priority compared to the channel state information reports in the set of channel state information reports.

In one embodiment, an apparatus comprises: a receiver configured to receive channel state information report configuration information, wherein the channel state information report configuration information comprises: information indicating one or more channel state information-reference signal resource configurations associated with at least one non-zero power channel state information reference signal resource set for channel measurement; and information indicating that the channel state information report configuration corresponding to multiple points is used, wherein the multiple points are associated with a primary group of points or a secondary group of points; and a processor configured to: perform channel measurements using the at least one non-zero power channel state information reference signal resource set; and generate a set of channel state information reports based on the channel state information report configuration information.

In certain embodiments, each point of the multiple points corresponds to a transmission-and-reception point or a panel of a transmission-and-reception point.

In some embodiments, the information indicating that channel state information feedback for multiple points is used comprises: a radio resource control parameter within the channel state information report configuration; a channel state information report quantity within the channel state information report configuration; a quasi-co-location relationship involving one or more channel state information reference signal resources within that at least one channel state information reference signal resource set; a codepoint indicating different downlink control information states; a codebook type parameter; a codebook configuration parameter; a transmission configuration indicator codepoint from a transmission configuration comprising at least two transmission configuration indicator states; an indication of a spatial division multiplexing scheme across multiple points; or some combination thereof.

In various embodiments, the primary group of points comprises one point, and the secondary group of points comprises at least one point.

In one embodiment, joint transmission from two points corresponds to a primary point and a secondary point in the primary group of points and the secondary group of points, the primary point is associated with a non-zero power channel state information reference signal resource for channel measurement that is quasi-co-located with a physical downlink control channel, and a rank indicator value carried in a channel state information report corresponding to the secondary point channel state information feedback does not exceed two.

In certain embodiments, each point of the multiple points is associated with a non-zero power channel state information reference signal resource for channel measurement of the channel state information reference signal resource set, and one or more non-zero power channel state information reference signal resources for interference measurement are quasi-co-located with the non-zero power channel state information reference signal resource for channel measurement.

In some embodiments, the apparatus further comprises a transmitter configured to transmit the set of channel state information reports in an order based on a channel state information priority function, wherein the channel state information priority function is calculated using a formula, where a channel state information report with a lower formula value has a higher priority: $\mathrm{Pri}_{iCSI}(y,k,c,s,g) = 2 \cdot N_{cells} \cdot M_s \cdot N_g \cdot y + N_{cells} \cdot M_s \cdot N_g \cdot k + M_s \cdot N_g \cdot c + N_g \cdot s + g$, where $N_g$ is a total number of channel state information report groups, g is an index corresponding to values 0 to $N_g - 1$, s is a channel state information configuration index, $M_s$ is a maximum number of channel state information reporting configurations, c is a cell index, $N_{cells}$ is a number of serving cells, k is 0 for channel state information reports carrying a layer 1 reference signal received power or layer 1 signal to noise ratio, or otherwise 1, and y is 0 for aperiodic reports, 1 for semi-persistent reports transmitted on a physical uplink shared channel, 2 for semi-persistent reports transmitted on a physical uplink control channel, or 3 for periodic reports.

In various embodiments, a channel state information report of the set of channel state information reports that corresponds to single-point transmission has a higher priority than a channel state information report of the set of channel state information reports that corresponds to joint transmission from multiple points, and a channel state information report corresponding to single-point transmission from the primary point has a higher priority compared to the channel state information reports in the set of channel state information reports.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:

receiving channel state information (CSI) report configuration information, wherein the CSI report configuration information comprises:

information indicating one or more CSI reference signal (RS) resource configurations associated with a non-zero power (NZP) CSI RS resource set for channel measurement and a CSI interference management resource set for interference measurement; and information indicating that CSI feedback corresponding to multiple points is used, wherein each point of the multiple points is associated with a NZP CSI RS resource for channel measurement of the CSI RS resource set, and the multiple points are associated with one or more CSI interference management resources for interference measurement of the CSI interference management resource set;

generating a set of CSI reports based on the CSI report configuration information, wherein each CSI report in the set of CSI reports comprises two parts; and reporting the set of CSI reports to a network.

2. The method of claim 1, wherein each point of the multiple points corresponds to a transmission-and-reception point (TRP) or a panel of a TRP.

3. The method of claim 1, wherein the information indicating that CSI feedback for multiple points is used comprises one or more of:

a radio resource control (RRC) parameter within the CSI report configuration;

a CSI report quantity within the CSI report configuration;

a quasi-co-location (QCL) relationship involving one or more CSI RS resources within the CSI RS resource set;

a codepoint indicating different downlink control information (DCI) states;

a codebook type parameter;

a codebook configuration parameter;

a transmission configuration indicator codepoint from a transmission configuration comprising at least two transmission configuration indicator (TCI) states; or an indication of a spatial division multiplexing scheme across multiple points.

4. The method of claim 1, wherein each point of the multiple points is associated with a CSI interference management resource for interference measurement.

5. The method of claim 4, wherein each NZP CSI RS resource for channel measurement is resource-wise associated with a CSI interference management resource by ordering of the NZP CSI RS resource and CSI interference management resource in corresponding resource sets, and a number of NZP CSI RS resources for channel measurement is equal to a number of the CSI interference management resources.

6. The method of claim 4, wherein the NZP CSI RS resource for channel measurement and the CSI interference management resource for interference measurement associated with a same point are quasi-co-located (QCL) with respect to 'QCL-TypeD'.

7. The method of claim 1, wherein the multiple points are associated with at least one NZP CSI RS resource for interference measurement.

8. The method of claim 1, wherein the set of CSI reports comprises two subsets of CSI reports, a first of the two subsets of CSI reports includes at least one CSI report corresponding to single-point transmission, and a second of the two subsets of CSI reports includes at least one CSI report corresponding to joint transmission from multiple points.

9. The method of claim 8, wherein a partition of CSI that is the same for two CSI reports associated with different subsets of the two subsets of CSI reports is reported in one of the two CSI reports.

10. The method of claim 1, wherein a subset of one or more CSI reports of the set of CSI reports is identified.

11. The method of claim 10, wherein the one or more CSI reports of the subset of CSI reports are identified based on one or more of:

a network configuration;

identifications of the CSI reports;

UE feedback;

a function of rank indicators of the one or more CSI reports; or a function of channel quality indicators (CQIs) of the one or more CSI reports.

12. The method of claim 10, wherein the one or more CSI reports of the subset of CSI reports are partially reported.

13. The method of claim 12, wherein a first part of the two parts of the one or more CSI reports of the subset of CSI reports are reported, and a second part of the two parts of the one or more CSI reports of the subset of CSI reports are not reported.

14. The method of claim 12, wherein a first part of the two parts and a first portion of a second part of the two parts of the one or more CSI reports of the subset of CSI reports are reported, and a last portion of the second part of two parts of the one or more CSI reports of the subset of CSI reports are not reported.

15. The method of claim 10, wherein the one or more CSI reports of the subset of CSI reports are not reported.

16. A user equipment (UE), comprising:

at least one memory; and at least one processor coupled with the at least one memory and configured to cause the UE to:

receive channel state information (CSI) report configuration information, wherein the CSI report configuration information comprises:

information indicating one or more CSI reference signal (RS) resource configurations associated with a non-zero power (NZP) CSI RS resource set for channel measurement and a CSI interference management resource set for interference measurement; and information indicating that CSI feedback corresponding to multiple points is used, wherein each point of the multiple points is associated with a NZP CSI RS resource for channel measurement of the CSI RS resource set, and the multiple points are associated with one or more CSI interference management resources for interference measurement of the CSI interference management resource set;

generate a set of CSI reports based on the CSI report configuration information, wherein each CSI report in the set of CSI reports comprises two parts; and report the set of CSI reports to a network.

17. The UE of claim 16, wherein the information indicating that CSI feedback for multiple points is used comprises one or more of:

a radio resource control (RRC) parameter within the CSI report configuration;

a CSI report quantity within the CSI report configuration;

a quasi-co-location (QCL) relationship involving one or more CSI RS resources within the CSI RS resource set;

a codepoint indicating different downlink control information (DCI) states;

a codebook type parameter;

a codebook configuration parameter;

a transmission configuration indicator (TCI) codepoint from a transmission configuration comprising at least two TCI states; or an indication of a spatial division multiplexing scheme across multiple points.

18. The UE of claim 16, wherein each point of the multiple points is associated with a CSI interference management resource for interference measurement.

19. The UE of claim 18, wherein each NZP CSI RS resource for channel measurement is resource-wise associated with a CSI interference management resource by ordering of the NZP CSI RS resource and CSI interference management resource in corresponding resource sets, and a number of NZP CSI RS resources for channel measurement is equal to a number of the CSI interference management resources.

20. The UE of claim 18, wherein the NZP CSI RS resource for channel measurement and the CSI interference management resource for interference measurement associated with a same point are quasi-co-located (QCL) with respect to 'QCL-TypeD'.

* * * * *